US008025239B2

(12) United States Patent (10) Patent No.: US 8,025,239 B2
Labrec et al. (45) Date of Patent: Sep. 27, 2011

(54) MULTIPLE IMAGE SECURITY FEATURES FOR IDENTIFICATION DOCUMENTS AND METHODS OF MAKING SAME

(75) Inventors: Brian C. Labrec, North Oxford, MA (US); Joseph Anderson, Salem, NH (US); Robert L. Jones, Andover, MA (US); Danielle Batey, Amherst, NH (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 0 days.

(21) Appl. No.: 12/822,910

(22) Filed: Jun. 24, 2010

(65) Prior Publication Data

US 2011/0000967 A1 Jan. 6, 2011

Related U.S. Application Data

(63) Continuation of application No. 10/991,354, filed on Nov. 16, 2004, now Pat. No. 7,744,001, which is a continuation of application No. 10/325,434, filed on Dec. 18, 2002, now Pat. No. 6,817,530.

(60) Provisional application No. 60/341,569, filed on Dec. 18, 2001, provisional application No. 60/344,683, filed on Dec. 24, 2001, provisional application No. 60/344,718, filed on Dec. 24, 2001.

(51) Int. Cl.
*G06K 19/06* (2006.01)
(52) U.S. Cl. ............ 235/492; 283/67; 283/70; 713/176; 726/5
(58) Field of Classification Search .................. 235/492; 283/67, 70; 713/176; 726/5
See application file for complete search history.

(56) References Cited

U.S. PATENT DOCUMENTS

| 60,442 | A | 12/1866 | Tufts |
| 1,094,593 | A | 4/1914 | Reed |
| 1,472,581 | A | 10/1923 | Britt |
| 2,815,310 | A | 12/1957 | Anderson |

(Continued)

FOREIGN PATENT DOCUMENTS

CA 2235002 A1 12/1998

(Continued)

OTHER PUBLICATIONS

U.S. Appl. No. 09/923,762, filed Aug. 19, 2003, Lofgren.

(Continued)

*Primary Examiner* — Allyson N Trail
(74) *Attorney, Agent, or Firm* — Mintz, Levin, Cohn, Ferris, Glovsky and Popeo, P.C.

(57) ABSTRACT

An identification document manufacturing method makes an identification document with an optically variable security feature by forming a lens structure in the document's lamination layer along with image information. The method provides image information arranged to include at least two different images. The method uses pressure to form a lens profile in a laminate, including combining the laminate with ink representing the image information to form the document. The document is formed together with the laminate and ink such that the lens profile enables display of the at least two different images when the document is viewed at different predetermined angles. An information bearing document comprises a core layer, an image layer depicting at least two different images, and a laminate layer. The laminate layer is pressed on the core layer such that it forms a lens profile that enables display of the at least two different images when the document is viewed at different predetermined angles.

7 Claims, 18 Drawing Sheets

U.S. PATENT DOCUMENTS

| | | |
|---|---|---|
| 3,225,457 A | 12/1965 | Schure |
| 3,413,171 A | 11/1968 | Hannon |
| 3,496,262 A | 2/1970 | Long et al. |
| 3,496,263 A | 2/1970 | Nakayama et al. |
| 3,569,619 A | 3/1971 | Simjian |
| 3,571,957 A | 3/1971 | Cumming et al. |
| 3,582,439 A | 6/1971 | Thomas |
| 3,601,913 A | 8/1971 | Pollock |
| 3,614,839 A | 10/1971 | Thomas |
| 3,647,275 A | 3/1972 | Ward |
| 3,665,162 A | 5/1972 | Yamamoto et al. |
| 3,703,628 A | 11/1972 | Philipson, Jr. |
| 3,758,970 A | 9/1973 | Annenberg |
| 3,802,101 A | 4/1974 | Scantlin |
| 3,805,238 A | 4/1974 | Rothfjell |
| 3,838,444 A | 9/1974 | Loughlin et al. |
| 3,845,391 A | 10/1974 | Crosby |
| 3,914,877 A | 10/1975 | Hines |
| 3,922,074 A | 11/1975 | Ikegami et al. |
| 3,936,613 A | 2/1976 | Nishigori et al. |
| 3,953,869 A | 4/1976 | Wah Lo et al. |
| 3,956,595 A | 5/1976 | Sobanski |
| 3,961,956 A | 6/1976 | Fukuda et al. |
| 3,984,624 A | 10/1976 | Waggener |
| 4,009,337 A | 2/1977 | Sakai et al. |
| 4,022,983 A | 5/1977 | Braun et al. |
| 4,069,487 A | 1/1978 | Kasai et al. |
| 4,096,015 A | 6/1978 | Kawamata et al. |
| 4,119,361 A | 10/1978 | Greenaway |
| 4,213,038 A | 7/1980 | Silverman et al. |
| 4,225,967 A | 9/1980 | Miwa et al. |
| 4,230,990 A | 10/1980 | Lert, Jr. et al. |
| 4,231,113 A | 10/1980 | Blasbalg |
| 4,238,849 A | 12/1980 | Gassmann |
| 4,252,995 A | 2/1981 | Schmidt et al. |
| 4,304,809 A | 12/1981 | Moraw et al. |
| 4,313,197 A | 1/1982 | Maxemchuk |
| 4,313,984 A | 2/1982 | Moraw et al. |
| 4,324,421 A | 4/1982 | Moraw et al. |
| 4,356,052 A | 10/1982 | Moraw et al. |
| 4,359,633 A | 11/1982 | Bianco |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |
| 4,417,784 A | 11/1983 | Knop et al. |
| 4,423,415 A | 12/1983 | Goldman |
| 4,425,642 A | 1/1984 | Moses et al. |
| 4,450,024 A | 5/1984 | Haghiri-Tehrani et al. |
| 4,476,468 A | 10/1984 | Goldman |
| 4,485,470 A | 11/1984 | Reali |
| 4,504,084 A | 3/1985 | Jauch |
| 4,506,148 A | 3/1985 | Berthold et al. |
| 4,528,588 A | 7/1985 | Lofberg |
| 4,532,508 A | 7/1985 | Ruell |
| 4,536,013 A | 8/1985 | Haghiri-Therani et al. |
| 4,547,804 A | 10/1985 | Greenberg |
| 4,553,261 A | 11/1985 | Froessl |
| 4,568,824 A | 2/1986 | Gareis et al. |
| 4,579,754 A | 4/1986 | Maurer et al. |
| 4,590,366 A | 5/1986 | Rothfjell |
| 4,595,950 A | 6/1986 | Lofberg |
| 4,617,216 A | 10/1986 | Haghiri-Tehrani et al. |
| 4,621,271 A | 11/1986 | Brownstein |
| 4,637,051 A | 1/1987 | Clark |
| 4,652,722 A | 3/1987 | Stone et al. |
| 4,653,775 A | 3/1987 | Raphael et al. |
| 4,653,862 A | 3/1987 | Morozumi |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | D'Agraives et al. |
| 4,679,154 A | 7/1987 | Blanford |
| 4,682,794 A | 7/1987 | Margolin |
| 4,689,477 A | 8/1987 | Goldman |
| 4,703,476 A | 10/1987 | Howard |
| 4,711,690 A | 12/1987 | Haghiri-Tehrani |
| 4,712,103 A | 12/1987 | Gotanda |
| 4,718,106 A | 1/1988 | Weinblatt |
| 4,725,462 A | 2/1988 | Kimura |
| 4,736,405 A | 4/1988 | Akiyama |
| 4,738,949 A | 4/1988 | Sethi et al. |
| 4,739,377 A | 4/1988 | Allen |
| 4,750,173 A | 6/1988 | Bluthgen |
| 4,765,656 A | 8/1988 | Becker et al. |
| 4,766,026 A | 8/1988 | Lass et al. |
| 4,775,901 A | 10/1988 | Nakano |
| 4,776,013 A | 10/1988 | Kafri et al. |
| 4,790,566 A | 12/1988 | Boissier et al. |
| 4,790,703 A | 12/1988 | Wing |
| 4,804,949 A | 2/1989 | Faulkerson |
| 4,805,020 A | 2/1989 | Greenberg |
| 4,807,031 A | 2/1989 | Broughton et al. |
| 4,809,321 A | 2/1989 | Morganstein et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,869,946 A | 9/1989 | Clay |
| 4,876,617 A | 10/1989 | Best et al. |
| 4,879,747 A | 11/1989 | Leighton et al. |
| 4,884,139 A | 11/1989 | Pommier |
| 4,888,798 A | 12/1989 | Earnest |
| 4,889,749 A | 12/1989 | Ohashi et al. |
| 4,893,336 A | 1/1990 | Wuthnow |
| 4,894,110 A | 1/1990 | Lass et al. |
| 4,903,301 A | 2/1990 | Kondo et al. |
| 4,908,836 A | 3/1990 | Rushforth et al. |
| 4,908,873 A | 3/1990 | Philibert et al. |
| 4,921,278 A | 5/1990 | Shiang et al. |
| 4,935,335 A | 6/1990 | Fotland |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,947,028 A | 8/1990 | Gorog |
| 4,963,998 A | 10/1990 | Maufe |
| 4,965,827 A | 10/1990 | McDonald |
| 4,967,273 A | 10/1990 | Greenberg |
| 4,968,063 A | 11/1990 | McConville et al. |
| 4,969,041 A | 11/1990 | O'Grady et al. |
| 4,972,471 A | 11/1990 | Gross et al. |
| 4,972,476 A | 11/1990 | Nathans |
| 4,977,594 A | 12/1990 | Shear |
| 4,979,210 A | 12/1990 | Nagata et al. |
| 4,990,759 A | 2/1991 | Gloton et al. |
| 4,993,068 A | 2/1991 | Piosenka et al. |
| 4,994,831 A | 2/1991 | Marandi |
| 4,994,926 A | 2/1991 | Gordon et al. |
| 4,996,530 A | 2/1991 | Hilton |
| 5,010,405 A | 4/1991 | Schreiber et al. |
| 5,013,900 A | 5/1991 | Hoppe |
| 5,023,907 A | 6/1991 | Johnson et al. |
| 5,024,989 A | 6/1991 | Chiang et al. |
| 5,027,401 A | 6/1991 | Soltesz |
| 5,036,513 A | 7/1991 | Greenblatt |
| 5,040,208 A | 8/1991 | Jolissaint |
| 5,046,087 A | 9/1991 | Sakai |
| 5,051,835 A | 9/1991 | Bruehl et al. |
| 5,053,608 A | 10/1991 | Senanayake |
| 5,053,956 A | 10/1991 | Donald et al. |
| 5,060,981 A | 10/1991 | Fossum et al. |
| 5,063,446 A | 11/1991 | Gibson |
| 5,073,899 A | 12/1991 | Collier et al. |
| 5,079,648 A | 1/1992 | Maufe |
| 5,086,469 A | 2/1992 | Gupta et al. |
| 5,093,147 A | 3/1992 | Andrus et al. |
| 5,095,196 A | 3/1992 | Miyata |
| 5,103,459 A | 4/1992 | Gilhousen et al. |
| 5,113,445 A | 5/1992 | Wang |

| Patent | Date | Inventor |
|---|---|---|
| 5,113,518 A | 5/1992 | Durst, Jr. et al. |
| 5,128,779 A | 7/1992 | Mallik |
| 5,138,712 A | 8/1992 | Corbin |
| 5,146,457 A | 9/1992 | Veldhuis et al. |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,169,707 A | 12/1992 | Faykish et al. |
| 5,171,625 A | 12/1992 | Newton |
| 5,173,840 A | 12/1992 | Kodai et al. |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,208,450 A | 5/1993 | Uenishi et al. |
| 5,212,551 A | 5/1993 | Conanan |
| 5,213,337 A | 5/1993 | Sherman |
| 5,216,543 A | 6/1993 | Calhoun |
| 5,228,056 A | 7/1993 | Schilling |
| 5,237,164 A | 8/1993 | Takada |
| 5,239,108 A | 8/1993 | Yokoyama et al. |
| 5,243,423 A | 9/1993 | DeJean et al. |
| 5,245,329 A | 9/1993 | Gokcebay |
| 5,253,078 A | 10/1993 | Balkanski et al. |
| 5,258,998 A | 11/1993 | Koide |
| 5,259,025 A | 11/1993 | Monroe et al. |
| 5,260,582 A | 11/1993 | Danek et al. |
| 5,261,987 A | 11/1993 | Luening et al. |
| 5,262,860 A | 11/1993 | Fitzpatrick et al. |
| 5,267,334 A | 11/1993 | Normille et al. |
| 5,267,755 A | 12/1993 | Yamauchi et al. |
| 5,276,478 A | 1/1994 | Morton |
| 5,280,537 A | 1/1994 | Sugiyama et al. |
| 5,284,364 A | 2/1994 | Jain |
| 5,288,976 A | 2/1994 | Citron et al. |
| 5,291,243 A | 3/1994 | Heckman et al. |
| 5,291,302 A | 3/1994 | Gordon et al. |
| 5,293,399 A | 3/1994 | Hefti |
| 5,294,774 A | 3/1994 | Stone |
| 5,295,203 A | 3/1994 | Krause et al. |
| 5,298,922 A | 3/1994 | Merkle et al. |
| 5,299,019 A | 3/1994 | Pack et al. |
| 5,301,981 A | 4/1994 | Nesis |
| 5,304,513 A | 4/1994 | Haghiri-Tehrani et al. |
| 5,305,400 A | 4/1994 | Butera |
| 5,315,098 A | 5/1994 | Tow |
| 5,319,453 A | 6/1994 | Copriviza et al. |
| 5,319,724 A | 6/1994 | Blonstein et al. |
| 5,319,735 A | 6/1994 | Preuss et al. |
| 5,321,751 A | 6/1994 | Ray et al. |
| 5,325,167 A | 6/1994 | Melen |
| 5,334,573 A | 8/1994 | Schild |
| 5,336,657 A | 8/1994 | Egashira et al. |
| 5,336,871 A | 8/1994 | Colgate, Jr. |
| 5,337,361 A | 8/1994 | Wang et al. |
| 5,351,302 A | 9/1994 | Leighton et al. |
| 5,363,212 A | 11/1994 | Taniuchi et al. |
| 5,374,976 A | 12/1994 | Spannenburg |
| 5,379,345 A | 1/1995 | Greenberg |
| 5,380,695 A | 1/1995 | Chiang et al. |
| 5,384,846 A | 1/1995 | Berson et al. |
| 5,385,371 A | 1/1995 | Izawa |
| 5,387,013 A | 2/1995 | Yamauchi et al. |
| 5,393,099 A | 2/1995 | D'Amato |
| 5,394,274 A | 2/1995 | Kahn |
| 5,396,559 A | 3/1995 | McGrew |
| 5,404,377 A | 4/1995 | Moses |
| 5,404,537 A | 4/1995 | Olnowich et al. |
| 5,408,542 A | 4/1995 | Callahan |
| 5,422,963 A | 6/1995 | Chen et al. |
| 5,422,995 A | 6/1995 | Aoki et al. |
| 5,428,607 A | 6/1995 | Hiller et al. |
| 5,428,731 A | 6/1995 | Powers, III |
| 5,432,329 A | 7/1995 | Colgate, Jr. et al. |
| 5,432,870 A | 7/1995 | Schwartz |
| 5,434,908 A | 7/1995 | Klein |
| 5,436,970 A | 7/1995 | Ray et al. |
| 5,446,273 A | 8/1995 | Leslie |
| 5,448,050 A | 9/1995 | Kostizak |
| 5,448,053 A | 9/1995 | Rhoads |
| 5,449,200 A | 9/1995 | Andric et al. |
| 5,450,490 A | 9/1995 | Jensen et al. |
| 5,454,598 A | 10/1995 | Wicker |
| 5,458,713 A | 10/1995 | Ojster |
| 5,459,584 A | 10/1995 | Gordon et al. |
| 5,463,209 A | 10/1995 | Figh et al. |
| 5,463,212 A | 10/1995 | Oshima et al. |
| 5,467,169 A | 11/1995 | Morikawa |
| 5,467,388 A | 11/1995 | Redd, Jr. et al. |
| 5,469,506 A | 11/1995 | Berson et al. |
| 5,471,533 A | 11/1995 | Wang et al. |
| 5,473,631 A | 12/1995 | Moses |
| 5,479,168 A | 12/1995 | Johnson et al. |
| 5,479,188 A | 12/1995 | Moriyama |
| 5,481,377 A | 1/1996 | Udagawa et al. |
| 5,488,664 A | 1/1996 | Shamir |
| 5,490,217 A | 2/1996 | Wang et al. |
| 5,493,677 A | 2/1996 | Balogh et al. |
| 5,495,411 A | 2/1996 | Ananda |
| 5,495,581 A | 2/1996 | Tsai |
| 5,496,071 A | 3/1996 | Walsh |
| 5,499,294 A | 3/1996 | Friedman |
| 5,502,576 A | 3/1996 | Ramsay et al. |
| 5,505,494 A | 4/1996 | Belluci et al. |
| 5,506,697 A | 4/1996 | Li et al. |
| 5,515,081 A | 5/1996 | Vasilik |
| 5,515,451 A | 5/1996 | Tsuji et al. |
| 5,524,933 A | 6/1996 | Kunt et al. |
| 5,526,524 A | 6/1996 | Madduri |
| 5,528,222 A | 6/1996 | Moskowitz et al. |
| 5,530,751 A | 6/1996 | Morris |
| 5,530,759 A | 6/1996 | Braudaway et al. |
| 5,530,852 A | 6/1996 | Meske, Jr. et al. |
| 5,533,102 A | 7/1996 | Robinson et al. |
| 5,534,372 A | 7/1996 | Koshizuka et al. |
| 5,548,645 A | 8/1996 | Ananda |
| 5,550,346 A | 8/1996 | Andriash et al. |
| 5,553,143 A | 9/1996 | Ross et al. |
| 5,557,412 A | 9/1996 | Saito et al. |
| 5,560,799 A | 10/1996 | Jacobsen |
| 5,568,555 A | 10/1996 | Shamir |
| 5,574,804 A | 11/1996 | Olschafskie et al. |
| 5,577,111 A | 11/1996 | Iida et al. |
| 5,579,479 A | 11/1996 | Plum |
| 5,579,694 A | 12/1996 | Mailloux |
| 5,583,918 A | 12/1996 | Nakagawa |
| 5,594,226 A | 1/1997 | Steger |
| 5,594,809 A | 1/1997 | Kopec et al. |
| 5,602,377 A | 2/1997 | Beller et al. |
| 5,612,943 A | 3/1997 | Moses et al. |
| 5,613,004 A | 3/1997 | Cooperman et al. |
| 5,617,119 A | 4/1997 | Briggs et al. |
| 5,619,557 A | 4/1997 | Van Berkum |
| 5,621,810 A | 4/1997 | Suzuki et al. |
| 5,629,980 A | 5/1997 | Stefik et al. |
| 5,633,119 A | 5/1997 | Burberry et al. |
| 5,633,489 A | 5/1997 | Dvorkis et al. |
| 5,634,012 A | 5/1997 | Stefik et al. |
| 5,635,012 A | 6/1997 | Belluci et al. |
| 5,635,697 A | 6/1997 | Shellhammer et al. |
| 5,636,276 A | 6/1997 | Brugger |
| 5,636,292 A | 6/1997 | Rhoads |
| 5,636,874 A | 6/1997 | Singer |
| 5,638,443 A | 6/1997 | Stefik et al. |
| 5,640,193 A | 6/1997 | Wellner |
| 5,640,647 A | 6/1997 | Hube |
| 5,640,677 A | 6/1997 | Karlsson |
| 5,646,697 A | 7/1997 | Kurashige |
| 5,646,997 A | 7/1997 | Barton |
| 5,646,999 A | 7/1997 | Saito |
| 5,651,054 A | 7/1997 | Dunn et al. |
| 5,652,626 A | 7/1997 | Kawakami et al. |
| 5,652,714 A | 7/1997 | Peterson et al. |
| 5,657,462 A | 8/1997 | Brouwer et al. |
| 5,659,164 A | 8/1997 | Schmid et al. |
| 5,659,626 A | 8/1997 | Ort et al. |
| 5,659,628 A | 8/1997 | Tachikawa et al. |

| | | | | | |
|---|---|---|---|---|---|
| 5,659,726 A | 8/1997 | Sandford, II et al. | 5,848,413 A | 12/1998 | Wolff |
| 5,661,574 A | 8/1997 | Kawana | 5,848,424 A | 12/1998 | Scheinkman et al. |
| 5,663,766 A | 9/1997 | Sizer, II | 5,852,673 A | 12/1998 | Young |
| 5,664,018 A | 9/1997 | Leighton | 5,856,661 A | 1/1999 | Finkelstein et al. |
| 5,665,951 A | 9/1997 | Newman et al. | 5,857,038 A | 1/1999 | Owada et al. |
| 5,668,636 A | 9/1997 | Beach et al. | 5,859,935 A | 1/1999 | Johnson et al. |
| 5,671,277 A | 9/1997 | Ikenoue et al. | 5,861,662 A | 1/1999 | Candelore |
| 5,671,282 A | 9/1997 | Wolff et al. | 5,862,218 A | 1/1999 | Steinberg |
| 5,673,316 A | 9/1997 | Auerbach et al. | 5,862,260 A | 1/1999 | Rhoads |
| 5,680,223 A | 10/1997 | Cooper et al. | 5,864,622 A | 1/1999 | Marcus |
| 5,681,356 A | 10/1997 | Barak et al. | 5,864,623 A | 1/1999 | Messina et al. |
| 5,684,885 A | 11/1997 | Cass et al. | 5,869,819 A | 2/1999 | Knowles et al. |
| 5,687,236 A | 11/1997 | Moskowitz et al. | 5,871,615 A | 2/1999 | Harris |
| 5,689,620 A | 11/1997 | Kopec et al. | 5,872,589 A | 2/1999 | Morales |
| 5,689,623 A | 11/1997 | Pinard | 5,875,249 A | 2/1999 | Mintzer et al. |
| 5,694,471 A | 12/1997 | Chen et al. | 5,879,502 A | 3/1999 | Gustafson |
| 5,696,594 A | 12/1997 | Saito et al. | 5,888,624 A | 3/1999 | Haghiri et al. |
| 5,697,006 A | 12/1997 | Taguchi et al. | 5,892,661 A | 4/1999 | Stafford et al. |
| 5,700,037 A | 12/1997 | Keller | 5,892,900 A | 4/1999 | Ginter et al. |
| 5,706,364 A | 1/1998 | Kopec et al. | 5,893,101 A | 4/1999 | Balogh et al. |
| 5,710,834 A | 1/1998 | Rhoads | 5,893,908 A | 4/1999 | Cullen et al. |
| 5,712,731 A | 1/1998 | Drinkwater et al. | 5,893,910 A | 4/1999 | Martineau et al. |
| 5,715,403 A | 2/1998 | Stefik | 5,900,608 A | 5/1999 | Iida |
| 5,717,940 A | 2/1998 | Peairs | 5,901,224 A | 5/1999 | Hecht |
| 5,721,781 A | 2/1998 | Deo et al. | 5,902,353 A | 5/1999 | Reber et al. |
| 5,721,788 A | 2/1998 | Powell et al. | 5,903,340 A | 5/1999 | Lawandy et al. |
| 5,726,685 A | 3/1998 | Kuth et al. | 5,903,729 A | 5/1999 | Reber et al. |
| 5,734,119 A | 3/1998 | France et al. | 5,905,248 A | 5/1999 | Russell et al. |
| 5,734,752 A | 3/1998 | Knox | 5,905,251 A | 5/1999 | Knowles |
| 5,738,024 A | 4/1998 | Winegar | 5,905,800 A | 5/1999 | Moskowitz et al. |
| 5,742,685 A | 4/1998 | Berson et al. | 5,905,819 A | 5/1999 | Daly |
| 5,742,845 A | 4/1998 | Wagner | 5,907,141 A | 5/1999 | Deaville et al. |
| 5,745,569 A | 4/1998 | Moskowitz et al. | 5,907,149 A | 5/1999 | Marckini |
| 5,745,604 A | 4/1998 | Rhoads | 5,909,209 A | 6/1999 | Dickinson |
| 5,748,763 A | 5/1998 | Rhoads | 5,912,767 A | 6/1999 | Lee |
| 5,748,783 A | 5/1998 | Rhoads | 5,912,974 A | 6/1999 | Holloway et al. |
| 5,751,795 A | 5/1998 | Hassler et al. | 5,913,210 A | 6/1999 | Call |
| 5,754,675 A | 5/1998 | Valadier | 5,915,027 A | 6/1999 | Cox et al. |
| 5,760,386 A | 6/1998 | Ward | 5,918,213 A | 6/1999 | Bernard et al. |
| 5,761,686 A | 6/1998 | Bloomberg | 5,918,214 A | 6/1999 | Perkowski |
| 5,763,868 A | 6/1998 | Kubota et al. | 5,919,730 A | 7/1999 | Gasper et al. |
| 5,765,152 A | 6/1998 | Erickson | 5,920,861 A | 7/1999 | Hall et al. |
| 5,765,176 A | 6/1998 | Bloomberg | 5,920,878 A | 7/1999 | DeMont |
| 5,767,496 A | 6/1998 | Swartz et al. | 5,926,822 A | 7/1999 | Garman |
| 5,768,426 A | 6/1998 | Rhoads | 5,930,369 A | 7/1999 | Cox et al. |
| 5,774,067 A | 6/1998 | Olnowich et al. | 5,930,377 A | 7/1999 | Powell et al. |
| 5,774,452 A | 6/1998 | Wolosewicz | 5,930,767 A | 7/1999 | Reber et al. |
| 5,776,278 A | 7/1998 | Tuttle et al. | 5,932,863 A | 8/1999 | Rathus et al. |
| 5,778,102 A | 7/1998 | Sandford, II et al. | 5,933,798 A | 8/1999 | Linnartz |
| 5,783,024 A | 7/1998 | Forkert | 5,933,829 A | 8/1999 | Durst et al. |
| 5,786,587 A | 7/1998 | Colgate, Jr. | 5,938,726 A | 8/1999 | Reber et al. |
| 5,787,186 A | 7/1998 | Schroeder | 5,938,727 A | 8/1999 | Ikeda |
| 5,788,285 A | 8/1998 | Wicker | 5,939,695 A | 8/1999 | Nelson |
| 5,790,662 A | 8/1998 | Valerij et al. | 5,939,699 A | 8/1999 | Perttunen et al. |
| 5,790,693 A | 8/1998 | Graves et al. | 5,940,595 A | 8/1999 | Reber et al. |
| 5,790,703 A | 8/1998 | Wang | 5,943,422 A | 8/1999 | Van Wie et al. |
| 5,799,092 A | 8/1998 | Kristol et al. | 5,946,414 A | 8/1999 | Cass et al. |
| 5,801,687 A | 9/1998 | Peterson et al. | 5,949,055 A | 9/1999 | Fleet et al. |
| 5,804,803 A | 9/1998 | Cragun et al. | 5,950,173 A | 9/1999 | Perkowski |
| 5,805,587 A | 9/1998 | Norris et al. | 5,951,055 A | 9/1999 | Mowry, Jr. |
| 5,808,758 A | 9/1998 | Solmsdorf | 5,953,710 A | 9/1999 | Fleming |
| 5,809,128 A | 9/1998 | McMullin | 5,955,021 A | 9/1999 | Tiffany, III |
| 5,809,139 A | 9/1998 | Girod et al. | 5,955,961 A | 9/1999 | Wallerstein |
| 5,809,317 A | 9/1998 | Kogan et al. | 5,960,081 A | 9/1999 | Vynne et al. |
| 5,809,633 A | 9/1998 | Mundigl et al. | 5,960,103 A | 9/1999 | Graves et al. |
| 5,812,551 A | 9/1998 | Tsukazoe et al. | 5,962,073 A | 10/1999 | Timmer |
| 5,818,441 A | 10/1998 | Throckmorton et al. | 5,962,834 A | 10/1999 | Markman |
| 5,822,432 A | 10/1998 | Moskowitz et al. | 5,962,840 A | 10/1999 | Haghiri-Tehrani et al. |
| 5,822,436 A | 10/1998 | Rhoads | 5,963,916 A | 10/1999 | Kaplan |
| 5,824,715 A | 10/1998 | Hayashihara et al. | 5,969,324 A | 10/1999 | Reber et al. |
| 5,825,867 A | 10/1998 | Epler et al. | 5,971,277 A | 10/1999 | Cragun et al. |
| 5,825,892 A | 10/1998 | Braudaway et al. | 5,974,141 A | 10/1999 | Saito |
| 5,828,325 A | 10/1998 | Wolosewicz et al. | 5,974,548 A | 10/1999 | Adams |
| 5,832,119 A | 11/1998 | Rhoads | 5,978,013 A | 11/1999 | Jones et al. |
| 5,832,186 A | 11/1998 | Kawana | 5,978,477 A | 11/1999 | Hull et al. |
| 5,838,458 A | 11/1998 | Tsai | 5,978,773 A | 11/1999 | Hudetz et al. |
| 5,841,886 A | 11/1998 | Rhoads | 5,979,757 A | 11/1999 | Tracy et al. |
| 5,841,978 A | 11/1998 | Rhoads | 5,979,941 A | 11/1999 | Mosher, Jr. et al. |
| 5,845,281 A | 12/1998 | Benson et al. | 5,983,218 A | 11/1999 | Syeda-Mahmood |

| | | |
|---|---|---|
| 5,984,366 A | 11/1999 | Priddy |
| 5,986,651 A | 11/1999 | Reber et al. |
| 5,991,876 A | 11/1999 | Johnson et al. |
| 5,994,710 A | 11/1999 | Knee et al. |
| 5,995,978 A | 11/1999 | Cullen et al. |
| 6,000,607 A | 12/1999 | Ohki et al. |
| 6,003,581 A | 12/1999 | Aihara |
| 6,006,226 A | 12/1999 | Cullen et al. |
| 6,012,641 A | 1/2000 | Watada |
| 6,016,225 A | 1/2000 | Anderson |
| 6,022,905 A | 2/2000 | Harris et al. |
| 6,024,287 A | 2/2000 | Takai et al. |
| 6,036,094 A | 3/2000 | Goldman et al. |
| 6,036,099 A | 3/2000 | Leighton |
| 6,045,656 A | 4/2000 | Foster et al. |
| 6,046,808 A | 4/2000 | Fateley |
| 6,047,888 A | 4/2000 | Dethloff |
| 6,049,055 A | 4/2000 | Fannash et al. |
| 6,049,463 A | 4/2000 | O'Malley et al. |
| 6,052,486 A | 4/2000 | Knowlton et al. |
| 6,054,021 A | 4/2000 | Kurrle et al. |
| 6,064,764 A | 5/2000 | Bhaskaran et al. |
| 6,066,594 A | 5/2000 | Gunn et al. |
| 6,073,854 A | 6/2000 | Bravenec et al. |
| 6,081,793 A | 6/2000 | Challener et al. |
| 6,085,205 A | 7/2000 | Peairs et al. |
| 6,085,976 A | 7/2000 | Sehr |
| 6,094,483 A | 7/2000 | Fridrich et al. |
| 6,095,566 A | 8/2000 | Yamamoto et al. |
| 6,100,804 A | 8/2000 | Brady et al. |
| 6,101,602 A | 8/2000 | Fridrich |
| 6,104,812 A | 8/2000 | Koltai et al. |
| 6,110,864 A | 8/2000 | Lu |
| 6,111,506 A | 8/2000 | Yap et al. |
| 6,122,403 A | 9/2000 | Rhoads |
| 6,128,411 A | 10/2000 | Knox |
| 6,131,161 A | 10/2000 | Linnartz |
| 6,136,752 A | 10/2000 | Paz-Pujalt et al. |
| 6,138,151 A | 10/2000 | Reber et al. |
| 6,141,753 A | 10/2000 | Zhao et al. |
| 6,146,032 A | 11/2000 | Dunham |
| 6,157,330 A | 12/2000 | Bruekers et al. |
| 6,158,658 A | 12/2000 | Barclay |
| 6,159,327 A | 12/2000 | Forkert |
| 6,160,526 A | 12/2000 | Hirai et al. |
| 6,163,842 A | 12/2000 | Barton |
| 6,164,534 A | 12/2000 | Rathus et al. |
| 6,182,090 B1 | 1/2001 | Peairs |
| 6,183,018 B1 | 2/2001 | Braun et al. |
| 6,185,042 B1 | 2/2001 | Lomb et al. |
| 6,185,312 B1 | 2/2001 | Nakamura et al. |
| 6,185,316 B1 | 2/2001 | Buffam |
| 6,185,683 B1 | 2/2001 | Ginter et al. |
| 6,192,138 B1 | 2/2001 | Yamadaji |
| 6,193,163 B1 | 2/2001 | Fehrman et al. |
| 6,196,460 B1 | 3/2001 | Shin |
| 6,199,048 B1 | 3/2001 | Hudetz et al. |
| 6,199,073 B1 | 3/2001 | Peairs et al. |
| 6,199,144 B1 | 3/2001 | Arora et al. |
| 6,201,879 B1 | 3/2001 | Bender et al. |
| 6,202,932 B1 | 3/2001 | Rapeli |
| 6,205,249 B1 | 3/2001 | Moskowitz |
| 6,219,439 B1 | 4/2001 | Burger |
| 6,233,347 B1 | 5/2001 | Chen et al. |
| 6,233,684 B1 | 5/2001 | Stefik et al. |
| 6,234,537 B1 | 5/2001 | Gutmann et al. |
| 6,243,480 B1 | 6/2001 | Zhao et al. |
| 6,244,514 B1 | 6/2001 | Otto |
| 6,246,775 B1 | 6/2001 | Nakamura et al. |
| 6,246,777 B1 | 6/2001 | Agarwal et al. |
| 6,247,644 B1 | 6/2001 | Horne et al. |
| 6,249,226 B1 | 6/2001 | Harrison et al. |
| 6,250,554 B1 | 6/2001 | Leo et al. |
| 6,256,736 B1 | 7/2001 | Coppersmith et al. |
| 6,257,486 B1 | 7/2001 | Teicher et al. |
| 6,272,176 B1 | 8/2001 | Srinivasan |
| 6,272,248 B1 | 8/2001 | Saitoh et al. |
| 6,272,634 B1 | 8/2001 | Tewfik et al. |
| 6,277,232 B1 * | 8/2001 | Wang et al. .................. 156/250 |
| 6,281,165 B1 | 8/2001 | Cranford |
| 6,283,188 B1 | 9/2001 | Maynard et al. |
| 6,285,776 B1 | 9/2001 | Rhoads |
| 6,286,036 B1 | 9/2001 | Rhoads |
| 6,286,761 B1 | 9/2001 | Wen |
| 6,289,108 B1 | 9/2001 | Rhoads |
| 6,292,092 B1 | 9/2001 | Chow et al. |
| 6,295,391 B1 | 9/2001 | Rudd et al. |
| 6,301,363 B1 | 10/2001 | Mowry, Jr. |
| 6,302,444 B1 | 10/2001 | Cobben |
| 6,304,345 B1 | 10/2001 | Patton et al. |
| 6,311,214 B1 | 10/2001 | Rhoads |
| 6,314,192 B1 | 11/2001 | Chen et al. |
| 6,314,457 B1 | 11/2001 | Schena et al. |
| 6,320,675 B1 | 11/2001 | Sakaki et al. |
| 6,321,981 B1 | 11/2001 | Ray et al. |
| 6,324,091 B1 | 11/2001 | Gryko et al. |
| 6,324,573 B1 | 11/2001 | Rhoads |
| 6,325,420 B1 | 12/2001 | Zhang et al. |
| 6,330,976 B1 | 12/2001 | Dymetman et al. |
| 6,332,031 B1 | 12/2001 | Rhoads et al. |
| 6,332,194 B1 | 12/2001 | Bloom et al. |
| 6,334,187 B1 | 12/2001 | Kadono |
| 6,334,721 B1 | 1/2002 | Horigane |
| 6,335,688 B1 | 1/2002 | Sweatte |
| 6,336,117 B1 | 1/2002 | Massarani |
| 6,343,138 B1 | 1/2002 | Rhoads |
| 6,351,815 B1 | 2/2002 | Adams |
| 6,354,630 B1 | 3/2002 | Zhang et al. |
| 6,356,363 B1 | 3/2002 | Cooper et al. |
| 6,357,664 B1 | 3/2002 | Zercher |
| 6,367,013 B1 | 4/2002 | Bisbee et al. |
| 6,373,965 B1 | 4/2002 | Liang |
| 6,385,330 B1 | 5/2002 | Powell et al. |
| 6,389,151 B1 | 5/2002 | Carr et al. |
| 6,390,362 B1 | 5/2002 | Martin |
| 6,390,375 B2 | 5/2002 | Kayanakis |
| 6,394,358 B1 | 5/2002 | Thaxton et al. |
| 6,404,643 B1 | 6/2002 | Chung |
| 6,404,926 B1 | 6/2002 | Miyahara et al. |
| 6,408,082 B1 | 6/2002 | Rhoads et al. |
| 6,411,725 B1 | 6/2002 | Rhoads |
| 6,418,154 B1 | 7/2002 | Kneip et al. |
| 6,421,013 B1 | 7/2002 | Chung |
| 6,424,029 B1 | 7/2002 | Giesler |
| 6,424,249 B1 | 7/2002 | Houvener |
| 6,424,725 B1 | 7/2002 | Rhoads et al. |
| 6,430,306 B2 | 8/2002 | Slocum et al. |
| 6,430,307 B1 | 8/2002 | Souma et al. |
| 6,438,251 B1 | 8/2002 | Yamaguchi |
| 6,441,380 B1 | 8/2002 | Lawandy |
| 6,442,284 B1 | 8/2002 | Gustafson et al. |
| 6,445,468 B1 | 9/2002 | Tsai |
| 6,463,416 B1 | 10/2002 | Messina |
| 6,466,329 B1 | 10/2002 | Mukai |
| 6,478,228 B1 | 11/2002 | Ikefuji et al. |
| 6,481,753 B2 | 11/2002 | Van Boom et al. |
| 6,482,495 B1 | 11/2002 | Kohama et al. |
| 6,485,319 B2 | 11/2002 | Bricaud et al. |
| 6,487,301 B1 | 11/2002 | Zhao |
| 6,505,160 B1 | 1/2003 | Levy et al. |
| 6,513,717 B2 | 2/2003 | Hannigan |
| 6,522,770 B1 | 2/2003 | Seder et al. |
| 6,536,665 B1 | 3/2003 | Ray et al. |
| 6,542,933 B1 | 4/2003 | Durst, Jr. et al. |
| 6,546,112 B1 | 4/2003 | Rhoads |
| 6,553,494 B1 | 4/2003 | Glass |
| 6,577,746 B1 | 6/2003 | Evans et al. |
| 6,580,815 B1 | 6/2003 | Grajewski et al. |
| 6,580,819 B1 | 6/2003 | Rhoads |
| 6,581,839 B1 | 6/2003 | Lasch et al. |
| 6,591,249 B2 | 7/2003 | Zoka |
| 6,608,911 B2 | 8/2003 | Lofgren et al. |
| 6,614,914 B1 | 9/2003 | Rhoads et al. |
| 6,638,635 B2 | 10/2003 | Hattori et al. |
| 6,650,761 B1 | 11/2003 | Rodriguez et al. |
| 6,679,425 B1 | 1/2004 | Sheppard et al. |
| 6,681,028 B2 | 1/2004 | Rodriguez et al. |
| 6,687,345 B1 | 2/2004 | Swartz et al. |

| | | | |
|---|---|---|---|
| 6,698,653 B1 | 3/2004 | Diamond et al. | |
| 6,715,797 B2 * | 4/2004 | Curiel | 283/67 |
| 6,728,397 B2 | 4/2004 | McNeal | |
| 6,748,533 B1 | 6/2004 | Wu et al. | |
| 6,751,336 B2 | 6/2004 | Zhao | |
| 6,752,432 B1 | 6/2004 | Richardson | |
| 6,754,822 B1 | 6/2004 | Zhao | |
| 6,758,394 B2 | 7/2004 | Maskatiya et al. | |
| 6,764,014 B2 | 7/2004 | Lasch et al. | |
| 6,771,981 B1 | 8/2004 | Zalewski et al. | |
| 6,782,116 B1 | 8/2004 | Zhao et al. | |
| 6,786,397 B2 | 9/2004 | Silverbrook et al. | |
| 6,788,800 B1 | 9/2004 | Carr et al. | |
| 6,803,114 B1 | 10/2004 | Vere et al. | |
| 6,804,376 B2 | 10/2004 | Rhoads et al. | |
| 6,804,378 B2 | 10/2004 | Rhoads | |
| 6,817,530 B2 | 11/2004 | Labrec et al. | |
| 6,823,075 B2 | 11/2004 | Perry | |
| 6,827,277 B2 | 12/2004 | Bloomberg et al. | |
| 6,829,368 B2 | 12/2004 | Meyer et al. | |
| 6,843,422 B2 | 1/2005 | Jones et al. | |
| 6,869,023 B2 | 3/2005 | Hawes | |
| 6,883,716 B1 | 4/2005 | De Jong | |
| 6,900,767 B2 | 5/2005 | Hattori | |
| 6,923,378 B2 | 8/2005 | Jones et al. | |
| 6,926,203 B1 | 8/2005 | Sehr | |
| 6,944,650 B1 | 9/2005 | Urien | |
| 6,947,571 B1 | 9/2005 | Rhoads et al. | |
| 6,958,346 B2 | 10/2005 | Stoltefuss et al. | |
| 6,959,098 B1 | 10/2005 | Alattar | |
| 6,970,573 B2 | 11/2005 | Carr et al. | |
| 6,978,036 B2 | 12/2005 | Alattar et al. | |
| 6,999,936 B2 | 2/2006 | Sehr | |
| 7,024,563 B2 | 4/2006 | Shimosato et al. | |
| 7,043,052 B2 | 5/2006 | Rhoads | |
| 7,044,395 B1 | 5/2006 | Davis et al. | |
| 7,072,526 B2 | 7/2006 | Sakuramoto | |
| 7,086,666 B2 | 8/2006 | Richardson | |
| 7,113,596 B2 | 9/2006 | Rhoads | |
| 7,152,786 B2 | 12/2006 | Brundage et al. | |
| 7,159,116 B2 | 1/2007 | Moskowitz | |
| 7,167,844 B1 | 1/2007 | Leong et al. | |
| 7,171,018 B2 | 1/2007 | Rhoads et al. | |
| 7,181,042 B2 | 2/2007 | Tian | |
| 7,185,201 B2 | 2/2007 | Rhoads et al. | |
| 7,191,156 B1 | 3/2007 | Seder | |
| 7,194,106 B2 | 3/2007 | Brundage et al. | |
| 7,199,456 B2 | 4/2007 | Krappe et al. | |
| 7,206,820 B1 | 4/2007 | Rhoads et al. | |
| 7,209,573 B2 | 4/2007 | Evans et al. | |
| 7,278,580 B2 | 10/2007 | Jones et al. | |
| 7,289,643 B2 | 10/2007 | Brunk et al. | |
| 2001/0001854 A1 | 5/2001 | Schena et al. | |
| 2001/0002035 A1 | 5/2001 | Kayanakis | |
| 2001/0005837 A1 | 6/2001 | Kojo | |
| 2001/0006585 A1 | 7/2001 | Horigane | |
| 2001/0007975 A1 | 7/2001 | Nyberg et al. | |
| 2001/0014169 A1 | 8/2001 | Liang | |
| 2001/0021144 A1 | 9/2001 | Oshima et al. | |
| 2001/0022667 A1 | 9/2001 | Yoda | |
| 2001/0023421 A1 | 9/2001 | Numao et al. | |
| 2001/0024510 A1 | 9/2001 | Iwamura | |
| 2001/0026377 A1 | 10/2001 | Ikegami | |
| 2001/0028727 A1 | 10/2001 | Naito et al. | |
| 2001/0030759 A1 | 10/2001 | Hayashi et al. | |
| 2001/0030761 A1 | 10/2001 | Ideyama | |
| 2001/0033674 A1 | 10/2001 | Chen et al. | |
| 2001/0037309 A1 | 11/2001 | Vrain | |
| 2001/0037313 A1 | 11/2001 | Lofgren et al. | |
| 2001/0037455 A1 | 11/2001 | Lawandy et al. | |
| 2001/0040980 A1 | 11/2001 | Yamaguchi | |
| 2001/0043362 A1 | 11/2001 | Hull et al. | |
| 2001/0047426 A1 | 11/2001 | Hunter | |
| 2001/0052076 A1 | 12/2001 | Kadono | |
| 2001/0053235 A1 | 12/2001 | Sato | |
| 2001/0054149 A1 | 12/2001 | Kawaguchi et al. | |
| 2001/0054644 A1 | 12/2001 | Liang | |
| 2001/0056468 A1 | 12/2001 | Okayasu et al. | |
| 2002/0012446 A1 | 1/2002 | Tanaka | |
| 2002/0015509 A1 | 2/2002 | Nakamura et al. | |
| 2002/0018879 A1 | 2/2002 | Barnhart et al. | |
| 2002/0021001 A1 | 2/2002 | Stratford et al. | |
| 2002/0021824 A1 | 2/2002 | Reed et al. | |
| 2002/0023218 A1 | 2/2002 | Lawandy et al. | |
| 2002/0027359 A1 | 3/2002 | Cobben et al. | |
| 2002/0027612 A1 | 3/2002 | Brill et al. | |
| 2002/0027674 A1 | 3/2002 | Tokunaga et al. | |
| 2002/0031241 A1 | 3/2002 | Kawaguchi et al. | |
| 2002/0037093 A1 | 3/2002 | Murphy | |
| 2002/0040433 A1 | 4/2002 | Kondo | |
| 2002/0046171 A1 | 4/2002 | Hoshino | |
| 2002/0051162 A1 | 5/2002 | Kawaguchi et al. | |
| 2002/0057431 A1 | 5/2002 | Fateley et al. | |
| 2002/0067844 A1 | 6/2002 | Reed et al. | |
| 2002/0070280 A1 | 6/2002 | Ikefuji et al. | |
| 2002/0072989 A1 | 6/2002 | Van De Sluis | |
| 2002/0073317 A1 | 6/2002 | Hars | |
| 2002/0077983 A1 | 6/2002 | Tagashira | |
| 2002/0080271 A1 | 6/2002 | Eveleens et al. | |
| 2002/0080396 A1 | 6/2002 | Silverbrook et al. | |
| 2002/0080964 A1 | 6/2002 | Stone et al. | |
| 2002/0099943 A1 | 7/2002 | Rodriguez et al. | |
| 2002/0105654 A1 | 8/2002 | Goltsos | |
| 2002/0114013 A1 | 8/2002 | Hyakutake et al. | |
| 2002/0116508 A1 | 8/2002 | Khan et al. | |
| 2002/0118394 A1 | 8/2002 | Mckinley et al. | |
| 2002/0136459 A1 | 9/2002 | Imagawa et al. | |
| 2002/0150277 A1 | 10/2002 | Nishimoto et al. | |
| 2002/0163633 A1 | 11/2002 | Cohen | |
| 2002/0170966 A1 | 11/2002 | Hannigan et al. | |
| 2002/0176600 A1 | 11/2002 | Rhoads et al. | |
| 2002/0187215 A1 | 12/2002 | Trapani et al. | |
| 2003/0002710 A1 | 1/2003 | Rhoads | |
| 2003/0005304 A1 | 1/2003 | Lawandy et al. | |
| 2003/0012562 A1 | 1/2003 | Lawandy et al. | |
| 2003/0032033 A1 | 2/2003 | Anglin et al. | |
| 2003/0038174 A1 | 2/2003 | Jones | |
| 2003/0040957 A1 | 2/2003 | Rodriguez et al. | |
| 2003/0056104 A1 | 3/2003 | Carr et al. | |
| 2003/0099379 A1 | 5/2003 | Monk et al. | |
| 2003/0102660 A1 | 6/2003 | Rhoads | |
| 2003/0105762 A1 | 6/2003 | McCaffrey et al. | |
| 2003/0126121 A1 | 7/2003 | Khan et al. | |
| 2003/0140025 A1 | 7/2003 | Daum | |
| 2003/0171939 A1 | 9/2003 | Yagesh et al. | |
| 2004/0020992 A1 * | 2/2004 | Lasch et al. | 235/487 |
| 2004/0041804 A1 | 3/2004 | Ives et al. | |
| 2004/0064415 A1 | 4/2004 | Abdallah et al. | |
| 2004/0181671 A1 | 9/2004 | Brundage et al. | |
| 2005/0063562 A1 | 3/2005 | Brunk et al. | |
| 2005/0072849 A1 | 4/2005 | Jones | |
| 2005/0094848 A1 | 5/2005 | Carr et al. | |
| 2005/0109850 A1 | 5/2005 | Jones | |

FOREIGN PATENT DOCUMENTS

| | | |
|---|---|---|
| DE | 2943436 | 5/1981 |
| DE | 3806411 A1 | 9/1989 |
| EP | 058482 A1 | 8/1982 |
| EP | 372601 A1 | 6/1990 |
| EP | 411232 A2 | 2/1991 |
| EP | 441702 A1 | 8/1991 |
| EP | 479295 A1 | 4/1992 |
| EP | 493091 A1 | 7/1992 |
| EP | 581317 A2 | 2/1994 |
| EP | 590884 A2 | 4/1994 |
| EP | 629972 A2 | 12/1994 |
| EP | 642060 A2 | 3/1995 |
| EP | 650146 A1 | 4/1995 |
| EP | 705022 A2 | 4/1996 |
| EP | 705025 A2 | 4/1996 |
| EP | 0736860 | 10/1996 |
| EP | 0975147 A2 | 1/2000 |
| EP | 0991014 A2 | 4/2000 |
| EP | 991014 A2 | 4/2000 |
| EP | 991047 A2 | 4/2000 |
| EP | 1035503 A1 | 9/2000 |
| EP | 1046515 A1 | 10/2000 |
| EP | 1077570 A2 | 2/2001 |

| | | | |
|---|---|---|---|
| EP | 1117246 A1 | 7/2001 | |
| EP | 1134710 A2 | 9/2001 | |
| EP | 1137244 A2 | 9/2001 | |
| EP | 1147495 A1 | 10/2001 | |
| EP | 1152592 A1 | 11/2001 | |
| EP | 1173001 A2 | 1/2002 | |
| EP | 1209897 A2 | 5/2002 | |
| GB | 1472581 A | 5/1977 | |
| GB | 2063018 A | 5/1981 | |
| GB | 2067871 A | 7/1981 | |
| GB | 2196167 A | 4/1988 | |
| GB | 2204984 A | 11/1988 | |
| GB | 2325765 A | 12/1998 | |
| GB | 2344482 A | 6/2000 | |
| GB | 2346110 A | 8/2000 | |
| GB | 2360659 A | 9/2001 | |
| JP | 3185585 A | 8/1991 | |
| JP | 4-248771 A | 9/1992 | |
| JP | 5242217 A | 9/1993 | |
| JP | 07093567 | 4/1995 | |
| JP | 07108786 | 4/1995 | |
| JP | 7115474 A | 5/1995 | |
| JP | 08-50598 A | 2/1996 | |
| JP | 10171758 A | 6/1998 | |
| JP | 10177613 A | 6/1998 | |
| JP | 11259620 A | 9/1999 | |
| WO | WO-8204149 A1 | 11/1982 | |
| WO | WO-8908915 A1 | 9/1989 | |
| WO | WO-9427228 A1 | 11/1994 | |
| WO | WO-9510835 A1 | 4/1995 | |
| WO | WO-9513597 A2 | 5/1995 | |
| WO | WO-9514289 A2 | 5/1995 | |
| WO | WO-9520291 A1 | 7/1995 | |
| WO | WO-9603286 A1 | 2/1996 | |
| WO | WO-9626494 A1 | 8/1996 | |
| WO | WO-9627259 A1 | 9/1996 | |
| WO | WO-9636163 A2 | 11/1996 | |
| WO | WO-9743736 A1 | 11/1997 | |
| WO | WO-9814887 A1 | 4/1998 | |
| WO | WO-9819869 A1 | 5/1998 | |
| WO | WO-9820411 A1 | 5/1998 | |
| WO | WO-9820642 A1 | 5/1998 | |
| WO | WO-9824050 A1 | 6/1998 | |
| WO | WO-9840823 A1 | 9/1998 | |
| WO | WO-9849813 A1 | 11/1998 | |
| WO | WO-9924934 A1 | 5/1999 | |
| WO | WO-9934277 A2 | 7/1999 | |
| WO | WO-0043216 | 7/2000 | |
| WO | WO-0105075 A1 | 1/2001 | |
| WO | WO-0108405 A1 | 2/2001 | |
| WO | WO-0139121 A1 | 5/2001 | |
| WO | WO-0143080 A1 | 6/2001 | |
| WO | WO-0172030 A2 | 9/2001 | |
| WO | WO-0173997 A1 | 10/2001 | |
| WO | WO-0175629 A1 | 10/2001 | |
| WO | WO-0188883 A1 | 11/2001 | |
| WO | WO-0197128 A1 | 12/2001 | |
| WO | WO-0197175 A1 | 12/2001 | |
| WO | WO-0203328 A1 | 1/2002 | |
| WO | WO-0203385 A1 | 1/2002 | |
| WO | WO-0219269 A2 | 3/2002 | |
| WO | WO-0221846 A1 | 3/2002 | |
| WO | WO-0223481 A1 | 3/2002 | |
| WO | WO-0225599 A1 | 3/2002 | |
| WO | WO-0227618 A2 | 4/2002 | |
| WO | WO-0227720 A1 | 4/2002 | |
| WO | WO-0239719 A1 | 5/2002 | |
| WO | WO-02053499 | 7/2002 | |
| WO | WO-02095677 A2 | 11/2002 | |
| WO | WO-03005291 | 1/2003 | |

OTHER PUBLICATIONS

U.S. Appl. No. 10/954,966, Unknown, Hannigan.
U.S. Appl. No. 09/858,189, filed Feb. 27, 2007, Rhoads et al.
U.S. Appl. No. 10/836,639, filed Apr. 29, 2004, Daoshe n.
U.S. Appl. No. 09/694,465, filed Jul. 13, 2004, Rodriguez et al.
U.S. Appl. No. 09/679,262, filed Nov. 15, 2005, Rhoads.
U.S. Appl. No. 09/679,261, filed Oct. 4, 2000, Davis et al.
U.S. Appl. No. 09/631,409, filed Aug. 3, 2000, Brundag e et al.
U.S. Appl. No. 09/629,401, filed Feb. 18, 2003, Seder.
U.S. Appl. No. 09/619,264, filed Jul. 19, 2000, Kumar.
U.S. Appl. No. 09/571,442, filed Oct. 22, 2002, Rhoads et al.
U.S. Appl. No. 09/562,517, filed May 1, 2000, Davis et al.
U.S. Appl. No. 09/562,516, filed May 1, 2000, Hannig an.
U.S. Appl. No. 09/553,084, filed Jul. 8, 2003, Reed et al.
U.S. Appl. No. 09/547,664, filed Apr. 17, 2007, Rhoads et al.
U.S. Appl. No. 09/531,076, filed Mar. 18, 2000, Rhoads et al.
U.S. Appl. No. 09/503,881, filed Sep. 2, 2003, Rhoads et al.
U.S. Appl. No. 11/613,088, filed Dec. 16, 2006, Bundag e.
U.S. Appl. No. 09/465,418, filed Dec. 16, 1999, Rhoads et al.
U.S. Appl. No. 09/452,023, filed Jun. 18, 2002, Rhoads.
U.S. Appl. No. 09/452,022, filed Oct. 3, 2000, Alattar et al.
U.S. Appl. No. 09/433,104, filed Oct. 21, 2003, Rhoads et al.
U.S. Appl. No. 09/343,104, filed Jun. 29, 1999, Rodriguez et al.
U.S. Appl. No. 09/343,101, filed Jun. 29, 1999, Davis et al.
U.S. Appl. No. 09/342,971, filed Jun. 29, 1999, Rodrigu ez.
U.S. Appl. No. 09/342,689, filed Oct. 30, 2001, Rhoads.
U.S. Appl. No. 09/342,688, filed Nov. 18, 2003, Rodriguez et al.
U.S. Appl. No. 09/314,648, filed Jan. 20, 2004, Rodriguez et al.
U.S. Appl. No. 09/287,940, filed Jun. 17, 2003, Rhoads.
U.S. Appl. No. 10/233,069, filed Aug. 30, 2002, Carr.
U.S. Appl. No. 10/172,769, filed May 2, 2006, Miller et al.
U.S. Appl. No. 10/154,621, filed Dec. 6, 2005, Miller.
U.S. Appl. No. 10/115,582, filed Jun. 28, 2005, Reed, et al.
U.S. Appl. No. 10/115,441, filed Oct. 12, 2004, Reed.
U.S. Appl. No. 10/094,593, unknown, Hannigan.
U.S. Appl. No. 11/082,182, filed Mar. 15, 2006, Hawes.
U.S. Appl. No. 60/358,321, filed Feb. 19, 2002, Munday.
U.S. Appl. No. 60/356,881, filed Feb. 21, 2002, Hannig an et al.
U.S. Appl. No. 60/344,718, filed Dec. 24, 2001, LaBrec.
U.S. Appl. No. 60/344,683, filed Dec. 24, 2001, LaBrec.
U.S. Appl. No. 60/341,569, filed Dec. 18, 2001, LaBrec.
U.S. Appl. No. 60/323,148, filed Sep. 17, 2001, Davis et al.
U.S. Appl. No. 60/158,015, filed Oct. 6, 1999, Davis et al.
U.S. Appl. No. 60/141,763, Unknown, Davis.
U.S. Appl. No. 60/082,228, filed Apr. 16, 1998, Rhoads.
U.S. Appl. No. 60/000,442, filed Jun. 20, 1995, Hudetz.
"Best Practices for the Use of Magnetic Stripes," MVIS Magnetic Stripe Working Group, Report to AAMVA, Version 2.0, Apr. 1996, including a history on p. 3.
"Digimarc Information Embedding Technology Frequently Asked Questions", Sep. 1996, HTTP://WWW.DIGIMARC.COM, 19 pages.
"The Copyright Can of Worms Opened Up by the New Electronic Media," Computergram Internations, pCGN0717006, Jul. 17, 1995 and The Copyright Can of Worms Opened Up By the New Electronic Media-2, Computergram Internations, pCGN07210008, Jul. 21, 1995, 3 pages.
"Access Control and Copyright Protection for Images WorkPackage 8: Watermarking" Jun. 30 1995, 46 pages.
"Access Control and Copyright Protection for Images, Conditional Access and Copyright Protection Based on the Use of Trusted Third Parties," 1995, 43 pages.
"Access Control and Copyright Protection for Images, WorkPackage 1: Access Control and Copyright Protection for Images Need Evaluation," Jun. 1995, 21 pages.
"Access Control and Copyright Protection for Images, WorkPackage 3: Evaluation of Existing Systems," Apr. 19, 1995, 68 pages.
"Copyright Protection for Digital Images, Digital Fingerprinting from FBI,"Highwater FBI brochure 1995, 4 pages.
"Cyphertech Systems: Introduces Digital Encoding Device to Prevent TV Piracy," Hollywood Reporter, Oct. 20, 1993, p. 23.
"Foiling Card Forges With Magnetic Noise," Wall Street Journal, Feb. 8, 1994.
"High Water FBI Limited Presentation Image Copyright Protection Software," FBI Ltd. brochure, Jul. 1995, 17 pages.
"NAB-Cyphertech Starts Anti-Piracy Broadcast Tests", Newsbytes, NEW03230023, Mar. 23, 1994.
Alattar, "Smart Images' Using Digimarc's Watermarking Technology," IS&T/SPIE's 12th Int. Symposium on Electronic Imaging, San Jose, CA Jan. 25, 2000, vol. 3971, No. 25, 10 pages.

Amano, "A Feature Calibration Method for Watermarking of Document Images," Proc. 5.sup.th Int. Conf. on Document Analysis and Recognition, Sep. 1999, pp. 91-94.

American Association of Motor Vehicle Administrators: AAMVA National Standard for the Driver License/Identification Card. Copyright 2000.

Arachelian, "White Noise Storm," Apr. 11, 1994, Internet reference, 13 pages.

Arthur, "Digital Fingerprints Protect Artwork," New Scientist, Nov. 12, 1994, p. 24.

Article entitled "Lenticular Prints," 6 printed pages, printed on Dec. 16, 2002 and accessed from http://www.shortcourses.com/how/lenticular/lenticular.htm.

Battialo et al., "Robust Watermarking for Images Based on Color Manipulation," IH/99 LNCS 1768, pp. 302-317, 2000.

Bender et al, "Applications for Data Hiding," IBM Systems Journal, vol. 39, Nos. 3&4, 2000, pp. 547-568.

Bender et al., "Techniques for Data Hiding,"Massachusetts Institute of Technology, Media Laboratory, Jan. 1995, 10 pages.

Bloomberg, "Embedding Digital Data on Paper in Iconic Text" SPIE vol. 3027, Document Recognition IV, pp. 67-80 (1997).

Boland et al, "Watermarking Digital Images for Copyright Protection, "Fifth International Conference on Image Processing and its Applications, Conference Date Jul. 4-6, 1995, Conf. Publ. No. 410, pp. 326-330.

Boneh, "Collusion-Secure Fingerprinting for Digital Data," Department of Computer Science, Princeton University, 1995, 31 pages.

Bonny Lhotka, Karin Schminke, Dorothy Simpson Krause, "Lenticular Inkjet Printmaking", 2 printed pages, printed on Dec. 16, 2002 and accessed from http://www.dvpratt.com/evesmind/lentOver.htm.

Bovik, "Handbook of Image and Video Processing," Academic Press, 2000, pp. 133-136, 154, 155.

Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287.

Brown, "S-Tools for Windows, Version 1.00, COPYRGT. 1994 Andy Brown, What is Steganography," Internet reference, Mar. 6, 1994, 6 pages.

Brownwell, "Counterfeiters Dye Over Security Measures," SPIE's OE Magazine, Sep. 2001, pp. 8-9.

Bruckstein, A.M.; Richardson, T.J., A holographic transform domain image watermarking method, Circuits, Systems, and Signal Prcessing vol. 17, No. 3 p. 361-89, 1998. This paper includes an appendix containing an internal memo of Bell labs, which according to the authors of the paper, was dated Sep. 1994.

Caronni, "Assuring Ownership Rights for Digital Images," Published in the Proceedings of 'Reliable It Systems,' vis '95 HH. Bruggemann and W. Gerhardt-Hackl (Ed.), Vieweg Publishing Company, Germany, 1995, Jun. 14, 1994, 10 pages.

Castro et al., "Registration of Translated and Rotated Images Using Finite Fourier Transforms," IEEE Transactions on Pattern Analysis and Machine Intelligence, vol. PAMI-9, No. 5, Sep. 1987, pp. 700-703.

Chakrabarti et al., "Carnival Booth—an Algorithm for Defeating the Computer-Assisted Passenger Screening System", 30. pp (2002).

Choudhury, et al., "Copyright Protection for Electronic Publishing over Computer Networks," IEEE Network Magazine, Jun. 1994, 18 pages.

Chow et al., "Forgery and Tamper-Proof Identification Document", IEEE Proc. 1993 Int. Carnahan Conf. on Security Technology, 11-14 (Oct. 13-15, 1993).

Clarke, "Invisible Code Tags Electronic Images," Electronic Engineering Times, Jun. 12, 1995, n. 852, p. 42.

Collins et al., "Using Bar Code—Why It's Taking Over", Second Edition, Data Capture Institute, 1990 (Contents & Index). (U.S. Appl. No. 10/094,593).

Dautzenberg, "Watermarking Images," Department of Microelectronics and Electrical Engineering, Trinity College Dublin, 47 pages, Oct. 1994.

Dittman, et al., "Hologram Watermarks for Document Authentications," pp. 60-64, Int. Conference on Information Technology: Coding and Computing (ITCC 2001).

EP 01992398.6 first examination report, dated Jan. 7, 2005.

EP 01992398.6 notice of grant, dated Nov. 28, 2005.

EP 01992398.6 response to first examination report, dated Jul. 18, 2005.

European Search Report for European Application No. 03713599.3-1229, mailed on Jul. 23, 2009.

Final Rejection, U.S. Appl. No. 10/836,639, Bi et al., filed Apr. 29, 2004.

Fitzgerald, "Invisible Digital Copyright ID," Editor & Publisher, Jun. 25, 1994, p. 62.

Fleet et al., "Embedding Invisible Information in Color Images," Proc. Int. Conf. on Image Processing vol. 1, pp. 532-535, Oct. 1997.

Friedman, "The Trustworthy Digital Camera: Restoring Credibility to the Photographic Image," IEEE Transaction on Consumer Electronics, vol. 39, No. 4, Nov. 1993, pp. 905-910.

Grieco, Jr. et al., "Behind Bars—Bar Coding Principles and Applications", PT Publication, Inc., 1989 (Table of Contents & Index) (U.S. Appl. No. 10/094,593).

Hecht, "Embedded Data Glyph Technology for Hardcopy Digital Documents," SPIE vol. 2171, Feb. 1994, pp. 341-352.

Humphrey, "Stamping Out Crime", Hollywood Reporter, Jan. 26, 1994, p. S48.

International Search Report for PCT/US03/05337, mailed Feb. 17, 2004.

Jain, "Image Coding Via a Nearest Neighbors Image Model", IEEE Transactions on Communications, vol. COM-23, No. 3, Mar. 1975, pp. 318-331.

Johnson, et al., "Bridging the Paper and Electronic Worlds: The Paper User Interface", Interchi '93, pp. 507-512, Apr. 1993.

JPEG Group's JPEG Software (release 4), FTP.CSUA.BEREKELEY.EDU/PUB/CYPHERPUNKS/APPLICATIONS/JSTEG/JPEG.ANNOUNCEMENT.GZ, Jun. 7, 1993, 2 pages.

Kassam, Signal Detection in Non-Gaussian Noise, Dowden & Culver, 1988, pp. 1-96.

Kawagucki, et al., "Principle and Applications of BPCS-Streganography," Proc. SPIE vol. 3258: Multimedia Systems and Applications, Nov. 2-4, 1998, pp. 464-473.

Knox, "Digital Watermarks Using Stochastic Screens," SPIE, vol. 3018, Apr. 1997, pp. 316-322.

Koch, et al., "Towards Robust and Hidden Image Copyright Labeling," Proc. of 1995 IEEE Workshop on Nonlinear Signal and Image Processing, Jun. 20-22, 1995, 4 pages.

Koch, et al., "Copyright Protection for Multimedia Data," Fraunhofer Institute for Computer Graphics, Dec. 16, 1994, 15 pages.

Koch, et al., "Towards Robust and Hidden Image Copyright Labeling," Proc. of 1995 IEEE Workshop on Nonlinear Signal and Image Processing, Jun. 20-22, 1995 4 pages.

Kohda et al., "Digital Watermarking Through CDMA Channels Using Spread Spectrum Techniques," 2000 IEEE, pp. 671-674.

Komatsu et al., "Authentication System Using Concealed Image in Telematics," Memoirs of the School of Science & Engineering, Waseda Univ., No. 52, 1988, pp. 45-60.

Komatsu, et al., "A Proposal on Digital Watermarking in Document Image Communication and Its Application to Realizing a Signature," Electronics and Communications in Japan, Part I, vol. 73, No. 5, 1990, pp. 22-23.

Kurak et al., "A Cautionary Note on Image Downgrading," 1992 IEEE, pp. 153-159.

Kutter et al., "Digital Signature of Color Images Using Amplitude Modulation," SPIE vol. 3022, 1997, pp. 518-526.

Levy et al., *Plastics Extrusion Technology Handbook*, 354-360 (1989).

Lin et al., "Generating Robust Digital Signature for Image/Video Authentication" Proc. Multimedia and Security Workshop at ACM Multimedia'98, 49-54 (Sep. 1998).

Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944-957.

Matsui et al., "Embedding a Signature to Pictures Under Wavelet Transformation" Transactions of the Institute of Electronics Information and Communication Engineers D-II, vol. J79D-II, No. 6, 1017-1024 (Jun. 1996).

Matsui et al., "Video-Steganography: How to Secretly Embed a Signature in a Picture," IMA Intellectual Property Project Proceedings, Jan. 1995, vol. 1, Issue 1, pp. 187-205.

Matthews, "When Seeing is Not Believing," New Scientist, Oct. 16, 1993, pp. 13-15.

Mintzer et al., "Safeguarding Digital library Contents and Users" Digital watermarking, D-Lib Magazine, Dec. 1997: ISSN 1082-9873.

Moller, et al., "Rechnergestutzte Steganographie: Wie sie Funktioniert und warum folglich jede Reglementierung von Verschlusselung unsinnig ist," DuD, Datenschutz und Datensicherung, 18/6 (1994) 318-326.

Nakamura et al., "A Unified Coding Method of Dithered Image and Text Data Using Micropatterns," Electronics and Communications in Japan, Part 1, vol. 72, Nov. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Newman, William, et al. "A Desk Supporting Computer-Based Interaction with paper Documents," ACM Conference on Human Factors in Computing Systems (CHI '92) May 3-7, 1992, pp. 587-592.

Oruanaidh et al, "Watermarking Digital Images for Copyright Protection," http://www.kalman.mee.tcd.ie/people/jjr/eva_pap.html, Feb. 2, 1996, 8 pages.

Palmer, "The Bar Code Book", Third Edition, Helmers Publishing, Inc., 1995 (Contents & Index).

PCT—International Search Report for International Application No. PCT/US02/41320, mailed on Jul. 28, 2003.

PCT—Notification of Transmittal of the International Search Report or the Declaration, for International Application No. PCT/US02/41320, mailed on Jul. 28, 2003.

PCT—Notification of Transmittal of the International Search Report or the Declaration, for International Application No. PCT/US02/40843, mailed on May 15, 2003.

PCT—International Search Report for for International Application No. PCT/US02/40843, mailed on May 15, 2003.

Peairs, "Iconic Paper," Proceedings of the Third International Conference on Document Analysis and Recognition (ICDAR '95), pp. 1174-1179, 1995.

Pennebaker et al., JPEG Still Image Data Compression Standard, Chapter 3, "Aspects of the Human Visual System," pp. 23-27, 1993 Van Nostrand Reinhold, New York.

Pitas et al., "Applying Signatures on Digital Images," IEEE Workshop on Nonlinear and Signal Processing, Neos Marmaras, Greece, pp. 460-463, Jun. 1995.

Piva et al., "Exploiting the Cross-Correlation of RGB-Channels for Robust Watermarking of Color Images," 1999 IEEE, pp. 306-310.

Port, "Halting Highway Robbery on the Internet," Business Week, Oct. 17, 1994, p. 212.

Printed Orasee company web page entitled "Welcome to Orasee Corporation", 2 printed pages, printed on Dec. 13, 2002 and accessed from: http://www.orasee.com/one/main.php3.

Rao, et al. "Protofoil: Storing and Finding the Information Worker's Paper Documents in an Electric File Cabinet," Human Factors in Computing Systems (CHI '94), pp. 180-186, Boston, MA, Apr. 1994.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Robert Moran, "3-D Imagery", 3 printed pages, accessed and printed on Dec. 16, 2002 from http://www.flexography.org/flexo/article.cfm?ID=45.

Roberts, "Picture Coding Using Pseudorandom Noise", IRE Trans. on Information Theory, vol. 8, No. 2, Feb. 1962, pp. 145-154.

Sanford II, et al., "The Data Embedding Method," SPIE vol. 2615, Oct. 23, 1995, pp. 226-259.

Sapwater et al., "Electronic Copyright Protection," Photo>Electronic Imaging, vol. 37, No. 6, 1994, pp. 16-21.

Schneler, "Digital Signatures, Cryptographic Algorithms Can Create Nonforgeable Signatures for Electronic Documents, Making Them Valid Legal Instruments" BTYE, Nov. 1993, pp. 309-312.

Schreiber et al., "A Compatible High-Definition Television System Using the Noise-Margin Method of Hiding Enhancement Information, "SMPTE Journal, Dec. 1989, pp. 873-879.

Seybold Report on desktop Publishing, "Holographic Signatures for Digital Images," Aug. 1995, 1 page.

shaggy@phantom.com, "Hide and Seek v. 4.0," Internet reference, Apr. 10, 1994, 3 pages.

Sheng et al., "Experiments on Pattern Recognition Using Invariant Fourier-Mellin Descriptors," Journal of Optical Society of America, vol. 3, No. 6, Jun. 1986, pp. 771-776.

Short, "Steps Toward Unmasking Secure Communications," International Journal of Bifurcaton and Chaos, vol. 4, 1994, pp. 959-977.

Simmons, "Subliminal Channels; Past and Present," ETT, vol. 5 No. 4, Jul.-Aug. 1994, pp. 45-59.

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979. (U.S. Appl. No. 10/094,593).

Szepanski, "Additive Binary Data Transmiision for Video Signals", Papers Presented at Conf. of Comm. Engineering Soc., Sep. 30-Oct. 3, 1980, Technical Reports, vol. 74, pp. 342-352.

Tanaka et al., "A Visual Retrieval System with Private Information for Image Database," Proceeding International Conference on DSP Applications and Technology, Oct. 1991, pp. 415-421.

Tanaka et al., "Embedding Secret Information into a Dithered Multi-Level Image," Proc. IEEE Military Comm. Conf., Sep. 1990, pp. 216-220.

Tanaka et al., "New Integrated Coding Schemes for Computer-Aided Facsimile," Proc. IEEE, Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

Tirkel et al., "Electronic Water Mark," DICTA-93, Macquarie University, Sydney, Australia, Dec. 1993, pp. 666-673.

Toga et al., "Registration Revisited," Journal of Neuroscience Methods, 48 (1993), pp. 1-13.

U.S. Appl. No. 09/531,076, Rhoads et al., filed Mar. 18, 2000, "System for Linking from Objects to Remote Resources,".

Van Schyndel et al., "A Digital Watermark," IEEE International Conference on Image Processing, Nov. 13-16, 1994, pp. 86-90.

Vidal et al., "Non-Noticeable Information Embedding in Color Images: Marking and Detection," IEEE (1999), pp. 293-297.

Vielhauer, et al., "Approaches to Biometric watermarks for owner auethentification," Security and Watermarking of Multimedia Contents III, Ping Wah Wong, Edward J. Delp III, Editors, Proceedings of SPIE vol. 4314 (2001).

Voyatzis et al., "Embedding Robust Watermarks by Chaotic Mixing," Digital Signal Processing Proceedings, IEEE Jul. 1977, pp. 213-216, vol. 1.

W. Rankl and W. Effing, "Smart Card Hand Book" 1997, John Wiley & Sons, pp. 35-40.

Wagner, "Fingerprinting," 1983 IEEE, pp. 18-22.

Walton, "Image Authentication for a Slippery New Age," Dr. Dobbs Journal, Apr. 1995, pp. 18-26, 82-87.

Wang et al., "Embedding Digital Watermarks in Halftone Screens," Security and Watermarking of Multimedia Contents II, Proc. of SPIE vol. 3971 (2000) pp. 218-227.

Weber et al., "Correlative Image Registration," Seminars in Nuclear Medicine, vol. XXIV, No. 4, Oct. 1994, pp. 311-323.

Whittaker, et al., "Back to the Future: Pen and Paper Technology Supports Complex Group Coordination," CHI '95, Conference on Human Factors in Computing Systems, Denver, Colorado (May 7-11, 1995) (text obtained from ACM).

Wise, "The History of Copyright, Photographers' Rights Span Three Centuries", Photo>Electronic Imaging, vol. 37, No. 6, 1994.

WO02/052499 search report, dated Aug. 30, 2002.

WO02/052499 Written Opinion, dated Mar. 18, 2004.

* cited by examiner

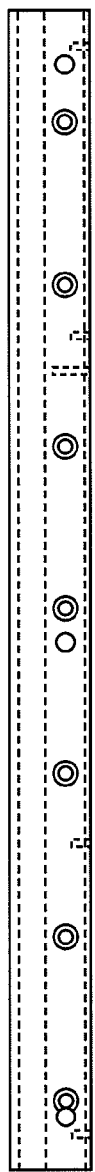
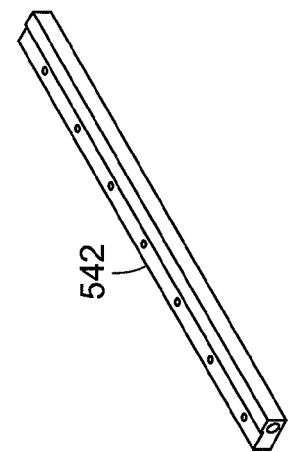
FIG. 15A
FIG. 15B
FIG. 15C
FIG. 15D

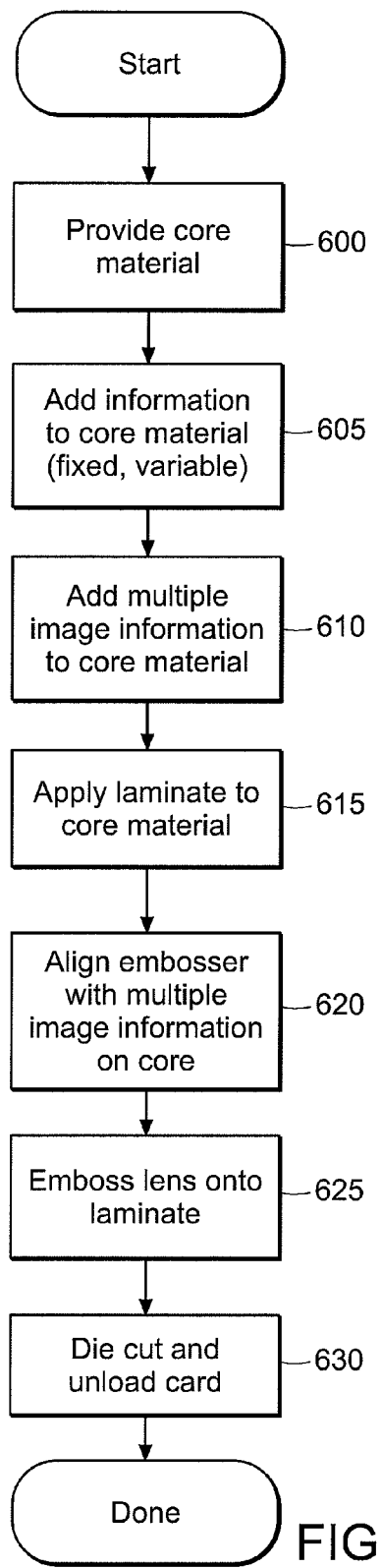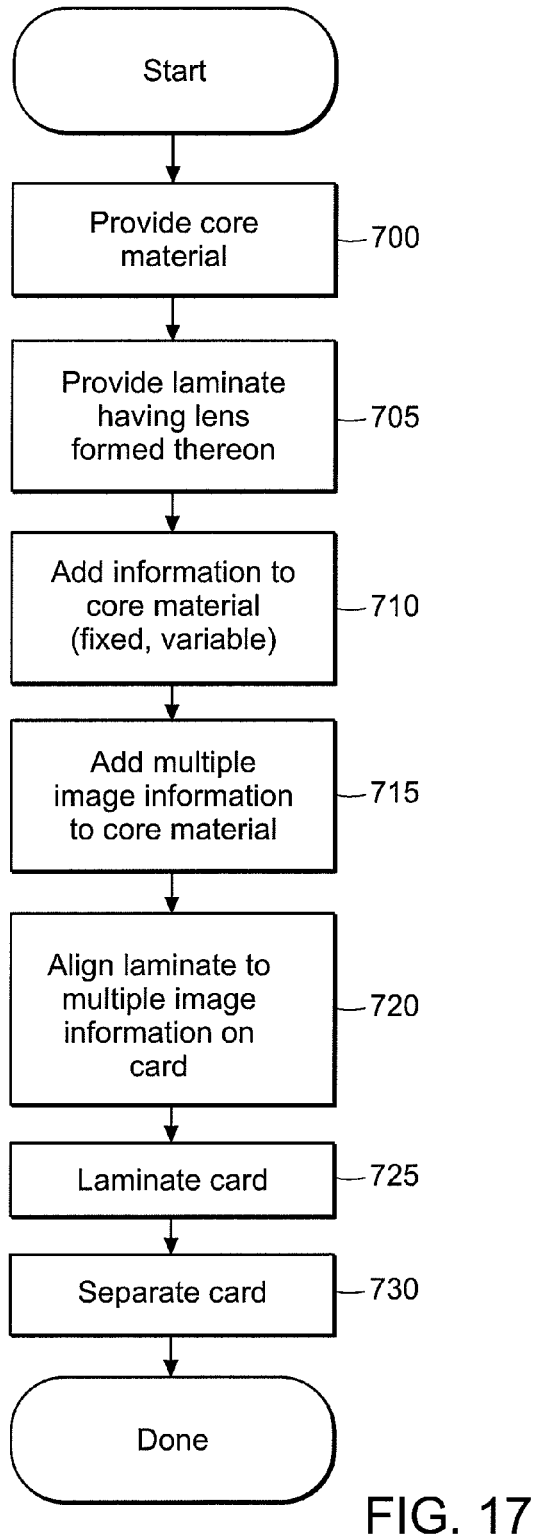
FIG. 16
FIG. 17

MULTIPLE IMAGE SECURITY FEATURES FOR IDENTIFICATION DOCUMENTS AND METHODS OF MAKING SAME

RELATED APPLICATION DATA

This application is a continuation of U.S. patent application Ser. No. 10/991,354, filed Nov. 16, 2004, now U.S. Pat. No. 7,744,001 which is a continuation of U.S. patent application Ser. No. 10/325,434, filed Dec. 18, 2002, now U.S. Pat. No. 6,817,530 which claims priority to Application Nos. 60/344,718, filed Dec. 24, 2001, 60/344,683, filed Dec. 24, 2001, and 60/341,569, filed Dec. 18, 2001, which are incorporated herein by reference in their entirety.

The present application is related to U.S. patent application Ser. No. 09/747,735, filed Dec. 22, 2000, Ser. No. 09/602,313, filed Jun. 23, 2000, and Ser. No. 10/094,593, filed Mar. 6, 2002, U.S. Provisional Patent Application No. 60/358,321, filed Feb. 19, 2002, as well as U.S. Pat. No. 6,066,594. Each of the above U.S. Patent documents is herein incorporated by reference.

FIELD

The invention relates in general to an information-bearing laminar assembly suitable for use as an identification card, and more particularly, to an information-bearing laminar assembly having thereon a plurality of lenticular lens elements that provide a multiple image security feature.

BACKGROUND AND SUMMARY

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an ATM, debit an account, or make a payment, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

In the production of images useful in the field of identification documentation, it is oftentimes desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. These signals are then utilized to print an image onto a data carrier. For example, information can be printed using a printer having a plurality of small heating elements (e.g., pins) for imagewise heating of each of a series of donor sheets (respectively, carrying sublimable cyan, magenta and yellow dye). The donor sheets are brought into contact with an image-receiving element (which can, for example, be a substrate) which has a layer for receiving the dyes transferred imagewise from the donor sheets. Thermal dye transfer methods as aforesaid are known and described, for example, in U.S. Pat. No. 4,621,271, issued Nov. 4, 1986 to S. Brownstein and U.S. Pat. No. 5,024,989, issued Jun. 18, 1991 to Y. H. Chiang, et al. Each of these patents is hereby incorporated by reference.

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents. Another security advantage with centrally issued documents is that the security features and/or secured materials used to make those features are centrally located, reducing the chances of loss or theft (as compared to having secured materials dispersed over a wide number of "on the spot" locations).

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document.

OTC identification documents of the types mentioned above can take a number of forms, depending on cost and desired features. Some OTC ID documents comprise highly plasticized polyvinyl chloride (PVC) or have a composite structure with polyester laminated to 0.5-2.0 mil (13-51 .mu.m) PVC film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the print head, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the print head. The choice of laminate dictates the degree of durability and security imparted to the system in protecting the image and other data.

FIGS. 1 and 2 illustrate a front view and cross-sectional view (taken along the A-A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint). Although not illustrated in FIG. 1, the ID document 10 can include a magnetic stripe (which, for example, can be on the rear side (not shown) of the ID document 10), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a preprinted core 20 (such as, for example, white polyvinyl chloride (PVC) material) that is, for example, about 25 mil thick. The core 20 is laminated with a transparent material, such as clear PVC material 22, which, by way of example, can be about 1-5 mil thick. The composite of the core 20 and clear PVC material 22 form a so-called "card blank" 25 that can be up to about 30 mils thick. Information 26*a-c* is printed on the card blank 25 using a method such as Dye Diffusion Thermal Transfer ("D2T2") printing (described further in commonly assigned U.S. Pat. No. 6,066,594, which is incorporated hereto by reference in its entirety.) The information 26*a-c* can, for example, comprise an indicium or indicia, such as the invariant or nonvarying information common to a large number of identification documents, for example the name and logo of the organization issuing the documents. The information 26*a-c* may be formed by any known process capable of forming the indicium on the specific core material used.

To protect the information 26*a-c* that is printed, an additional layer of overlaminate 24 can be coupled to the card blank 25 and printing 26*a-c* using, for example, 1 mil of adhesive (not shown). The overlaminate 24 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

Because ID documents 10 can be used to enable and facilitate personal identification, it often is desirable to manufacture the ID document 10 in a manner to deter counterfeiting and/or fraudulent alteration. There are a number of known ways to increase the security of ID documents 10, including methods that incorporate additional information or security features and methods that adapt existing information on the card to help prevent or make evident fraud. For example, numerous types of laminations have been employed in which the information-bearing surface is heat or solvent-laminated to a transparent surface. The materials for and the process of lamination are selected such that if an attempt is made to uncover the information-bearing surface for amendment thereof, the surface is destroyed, defaced or otherwise rendered apparent the attempted intrusion.

While an identification card that essentially cannot be disassembled without being destroyed may provide suitable resistance against fraudulent alteration, it might not significantly challenge all attempts of counterfeiting. The counterfeiting of identification cards also can involve the fabrication and issuance of identification cards by persons not authorized to do so. Such counterfeiting presents additional and different security problems to the art. One possible way of preventing fraudulent fabrication and issuing could involve strict control over the possession of the materials and equipment involved in the fabrication of the identification card. In some instances, however, this approach is impractical and/or impossible, especially if any of the materials involved are commercially available and used in other applications.

One response to the counterfeiting problem has involved the integration of verification features that are difficult to copy by hand or by machine. One such verification feature is the use in the card of a signature of the card's issuer or bearer. Other verification features have involved, for example, the use of watermarks, biometric information, microprinting, fluorescent materials, fine line details, validation patterns or marking, and polarizing stripes. These verification features are integrated into an identification card in various ways and they may be visible or invisible in the finished card. If invisible, they can be detected by viewing the feature under conditions which render it visible. At least some of the verification features discussed above have been employed to help prevent and/or discourage counterfeiting. However, at least some of the features can be expensive and, in the case of features hidden from casual visual inspection, require specialized equipment and trained operator for authentication. It would be advantageous if an ID document included a security feature that would be difficult to reproduce either in a counterfeited document or by the fraudulent alteration of an original, but would for authentication require neither specialized equipment nor trained operators.

One possible solution to the desire to provide visible, self-authenticating security features on cards is using a so-called lenticular lens and lenticular image. A lenticular image is comprised of a sequence of images that are interlaced to form a singular image, where each individual image (or frame) is viewable at a different angle to the viewer when viewed through a lenticular lens. These various images are termed views.

For example, U.S. Pat. No. 4,869,946 ("the '946 patent") issued Sep. 26, 1989 describes a tamperproof security card comprised of a transparent upper layer having narrow parallel lenses on the outer surface, and an image containing substrate, the two layers forming a lenticular system by which images on the substrate are selectively visible depending upon the angle from which the card is viewed. The disclosure of this patent, insofar as it relates to the structure and operation of lenticular systems, is incorporated herein by reference. The embodiments disclosed in the '946 patent appear to contemplate having lenticular lens material over the entire surface of a card. In addition, the '946 patent states that the individual data image which is to be viewed through the lenticular lens is formed by laying down a photographic emulsion on an image substrate layer by means of a lenticular system (col. 3, lines 11-20).

It can be difficult to print variable/personalized information on ID documents using known methods, especially if the variable/personalized information varies in type, size, and location from card to card and if it is not desired that the entire card incorporate a lenticular lens feature. Because registration of the image to the lens can be important in ensuring good transitions in image appearance from one view to another, known systems have used simpler lenticular lens features, such as using the same pair of images (e.g., a pair of logos) on every card. A number of known systems, such as the '946 patent, also utilize the lens itself as a means to lay down the image to be viewed by it. One prior art system even uses a laser to engrave an image through the lenticular lens. Using the lens to create an image can be impractical for high volume applications (such as the aforementioned CI systems), where variable image data is printed on a core or substrate and/or on a laminate affixed to the core or substrate. In some situations, using a lens to create an image might limit the quality of the resultant image, because the angle at which the information is written requires a high degree of precision, increasing manufacturing costs.

Some other known systems print the multiple images on the lens itself, instead of on the substrate to which the lens attaches. Printing on the lens can make it difficult to achieve good registration between the lens and the image, which can result in poor image transition from one image to the other as image is viewed at varying angles. Printing on the lens also can limit the ability to handle images of varying sizes. Further, printing on a lens can be very difficult to do in high volume manufacturing environments such as making drivers licenses, because drivers licenses can have several formats which vary for different holders (e.g. under 21 driver, learners, and driver ID), and the aforementioned CI type driver license system can produce licenses for more than one state, which might involve using different art work and security features in different locations. It is inconvenient and expensive to have to change consumables (e.g., lens sheets) to enable varied printing.

It could be advantageous if the variable or personalized information associated with a card bearer could be used as a security feature, in a manner where the security feature is difficult to detect and/or duplicates, yet still able to be printable on the card at the time of card personalization. It could be advantageous if an identification document with a multiple image lenticular lens feature that uses personal information could be manufactured using conventional, inexpensive consumables already being used in the manufacture of identification documents (e.g., without requiring the use of expensive lenticular lens sheets). It further could be advantageous if an identification document could have a personalized full color multiple image lenticular lens feature.

The invention provides methods for making identification documents and identification documents with optically variable security features. One method provides image information arranged to include at least two different images. The method uses pressure to form a lens profile in a laminate, including combining the laminate with ink representing the image information to form the document. The document is formed together with the laminate and ink or dye such that the lens profile enables display of the at least two different images when the document is viewed at different predetermined angles.

An information bearing document comprises a core layer, an image layer depicting at least two different images, and a laminate layer. The laminate layer is pressed on the core layer such that it forms a lens profile that enables display of the at least two different images when the document is viewed at different predetermined angles.

Systems and methods are provided for making a secure ID card with multiple images. Printed information in the form of an interlaced image (which includes the interlacing of at least two images) is provided to an information-bearing layer. A substantially transparent film material is provided to substantially cover the information-bearing layer. A lens profile is embossed in a selected portion of the film material, such as the portion that at least partially covers the interlaced material. The portion of the interlaced image that is covered by the lenticular lens will present a different appearance depending on the angle at which the interlaced image is viewed. With the arrangement of the first embodiment, a secure ID card with multiple images security feature can be provided on a portion of the ID card while information on the other portions of the ID card are not obscured by the lenticular lens. In accordance with a further aspect of the invention, the lenticular lens can be fabricated prior to ID card construction and aligned with the ID card in order to provide the multiple images security feature on a portion of the ID card.

A method for making a secure ID card with multiple images is provided. Information is provided to an information bearing layer, the information constructed and arranged to be, capable of providing multiple images when printed information is viewed at different predetermined angles through an appropriate lens. At least a portion of the information is covered with a substantially a transparent film material. A lens profile is embossed on at least a second portion of the film material, the embossing forming a lens on the film material, the lens enabling the information to display multiple images when the information-bearing laminar assembly is viewed at different predetermined angles.

One embodiment provides an information bearing document having at least first side, the information bearing document comprising a core layer, an interlaced image, and a lenticular lens. The interlaced image is formed on the core layer, the interlaced image comprising at least two images constructed and arranged to provide at least two images when then interlaced image is viewed through a predetermined lenticular lens through at least two different predetermined angles. The lenticular lens is operably coupled to at least a portion of the interlaced image, the lenticular lens constructed and arranged be operable with the interlaced image to enable at least two images in the interlaced image to be viewable through the lenticular lens at two different angles.

The foregoing and other features and advantages of the present invention will be even more readily apparent from the following Detailed Description, which proceeds with reference to the accompanying drawings.

BRIEF DESCRIPTION OF THE DRAWINGS

The advantages, features, and aspects of embodiments of the invention will be more fully understood in conjunction with the following detailed description and accompanying drawings, wherein:

FIGS. 15A-D are top, cross-sectional, edge, and perspective views, respectively, of the heater bar of the insulator plate of FIGS. 14A-D and FIG. 11;

FIG. 16 is a flow chart of a first method for manufacturing the ID document of FIG. 3 using the system of FIG. 11, in accordance with one embodiment of the invention;

FIG. 17 is a flow chart of a second method for manufacturing the ID document of FIG. 3 in a central issue environment;

The drawings are not necessarily to scale, emphasis instead generally being placed upon illustrating the principles of the invention. In addition, in the figures, like numbers refer to like elements.

DETAILED DESCRIPTION OF THE INVENTION

Figure 1:
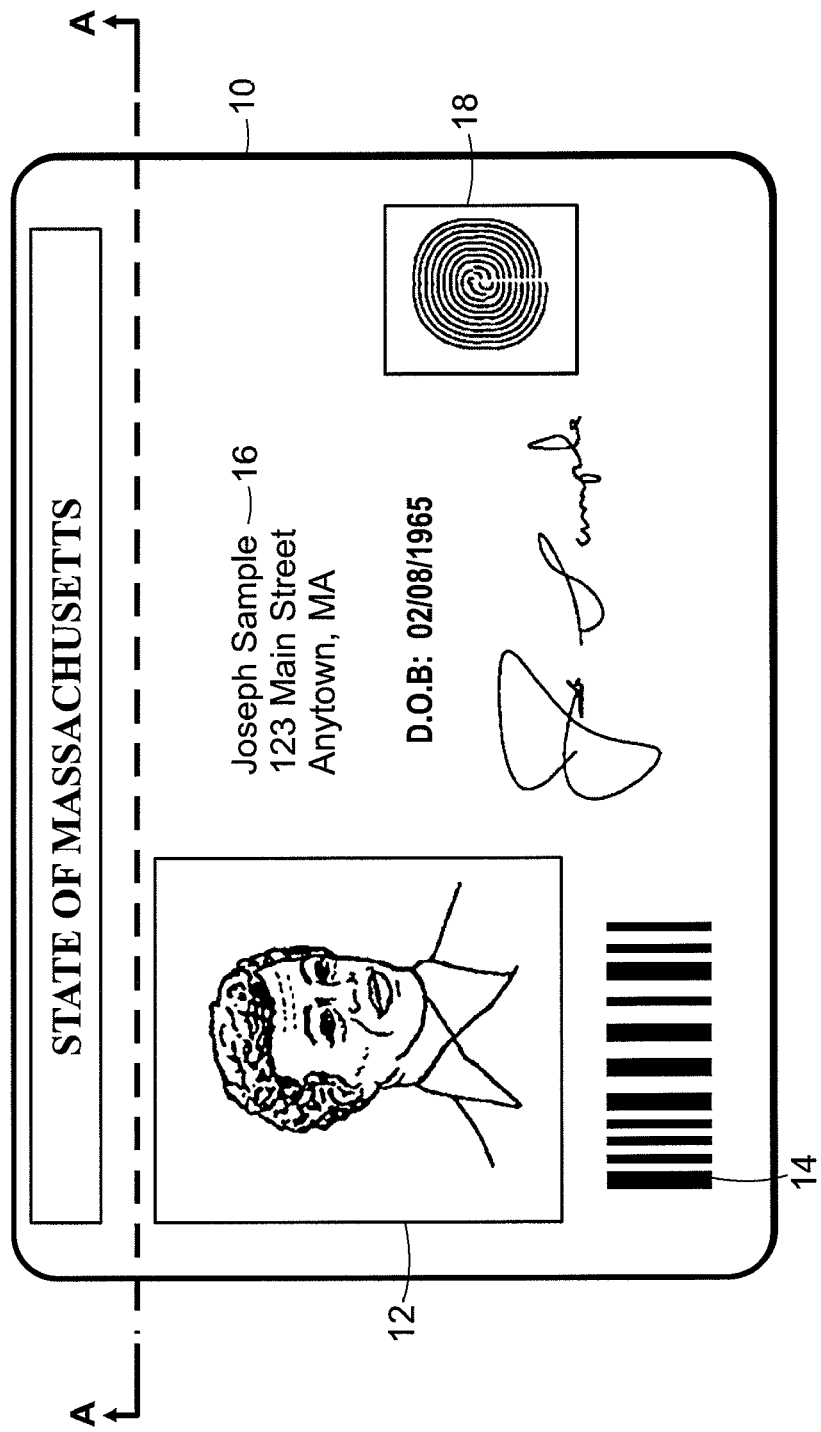
FIG. 1 is an illustrative example of a prior art identification document.
Figure 2:
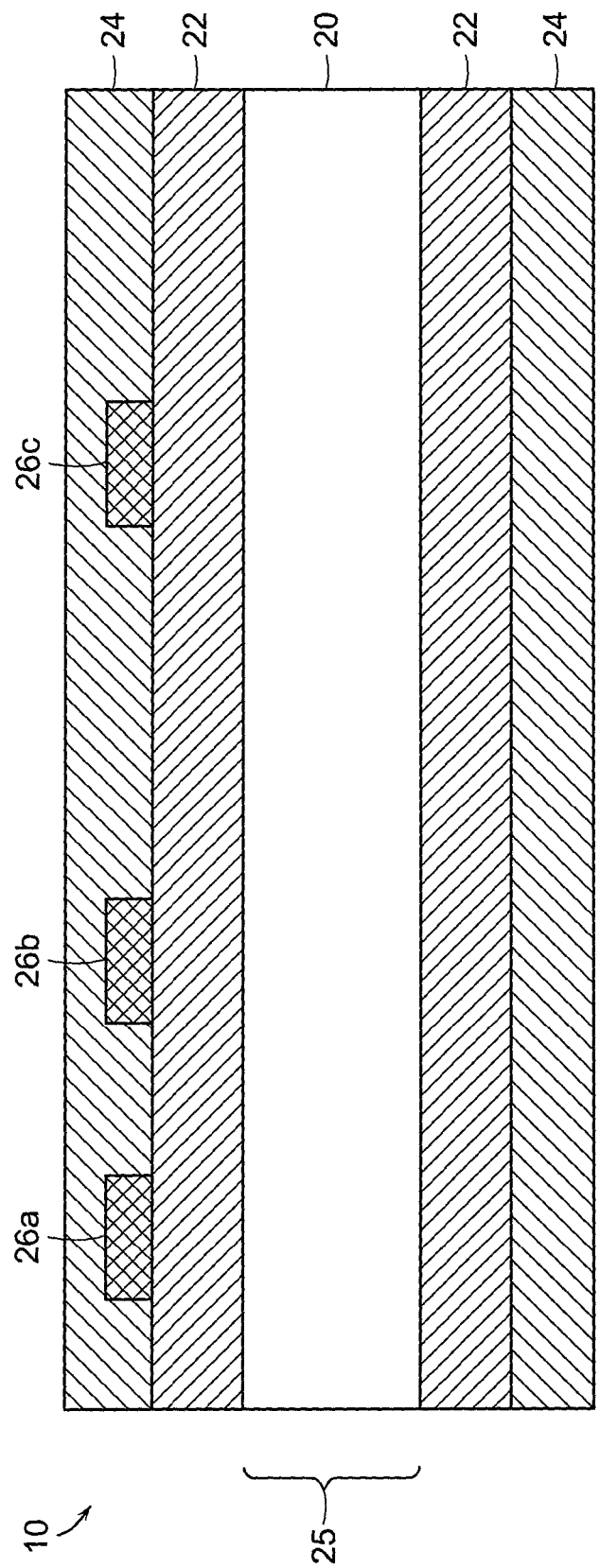
FIG. 2 is an illustrative cross section of the prior art identification document of FIG. 1, taken along the A-A line.

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards and badges, certificates, identification cards or documents, voter registration and/or identification cards, police ID cards, border crossing cards, security clearance badges and cards, gun permits, badges, gift certificates or cards, membership cards or badges, and tags. It is even contemplated that aspects of the invention may have applicability for devices such as compact disks, consumer products, knobs, keyboards, electronic components, etc., or any other suitable items or articles that may record information, images, and/or other data, which may be associated with a function and/or an object or other entity to be identified. Note also that, for the purposes of this disclosure, the terms "document," "card," "badge" and "documentation" are used interchangeably.

In addition, in the foregoing discussion, "identification" includes (but is not limited to) information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that is "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of potentially usable laminates include at least polyester, polycarbonate, polystyrene, cellulose ester, polyolefin, polysulfone, and polyamide. Laminates can be made using either an amorphous or biaxially oriented polymer as well. The laminate can comprise a plurality of separate laminate layers, for example a boundary layer and/or a film layer. Other possibly usable laminates include security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy. Laminates can include synthetic resin-impregnated or coated base materials composed of successive layers of material, bonded together via heat, pressure, and/or adhesive.

The material(s) from which a laminate is made may be transparent, but need not be. The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils. Lamination of any laminate layer(s) to any other layer of material (e.g., a core layer) can be accomplished using any conventional lamination process, and such processes are well known to those skilled in the production of articles such as identification documents. Of course, the types and structures of the laminates described herein are provided only by way of example, those skilled in the art will appreciated that many different types of laminates are usable in accordance with the invention. Various lamination processes are disclosed in assignee's U.S. Pat. Nos. 5,783,024, 6,007, 660, 6,066,594, and 6,159,327. Other lamination processes are disclosed, e.g., in U.S. Pat. Nos. 6,283,188 and 6,003,581. Each of these U.S. patents is herein incorporated by reference.

For purposes of illustration, the following description will proceed with reference to ID document structures (such as TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways to provide a multiple image feature thereon. Generally, the invention has applicability for virtually any product which is to be printed and especially those products which need to be uniquely identified and/or protected against fraud and/or tampering. For example, at least some embodiments of the invention are usable to form multiple image features on articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

It is further anticipated that the invention could even have applicability in manufacturing articles which are to have a multiple image feature formed thereon, but where the multiple image feature is not necessarily provided as a security feature. For example, it is anticipated that the invention has applicability in forming decorative multiple image features and/or customized multiple image features.

In one embodiment, the invention provides a novel information-bearing laminar assembly that would be suitable for use as or incorporated into an identification document, such as the ID document 10 of FIG. 1. The information-bearing laminar assembly of this embodiment is characterized by the provision therein, as a security feature, a lenticular lens portion disposed on an outer transparent layer, which provides multiple images in conjunction with information printed on an information-bearing layer. In at least one embodiment, the multiple images include at least one image that includes variable/personal information. In at least one embodiment, the multiple images include at least one color image, such as a full color portrait.

Figure 3:
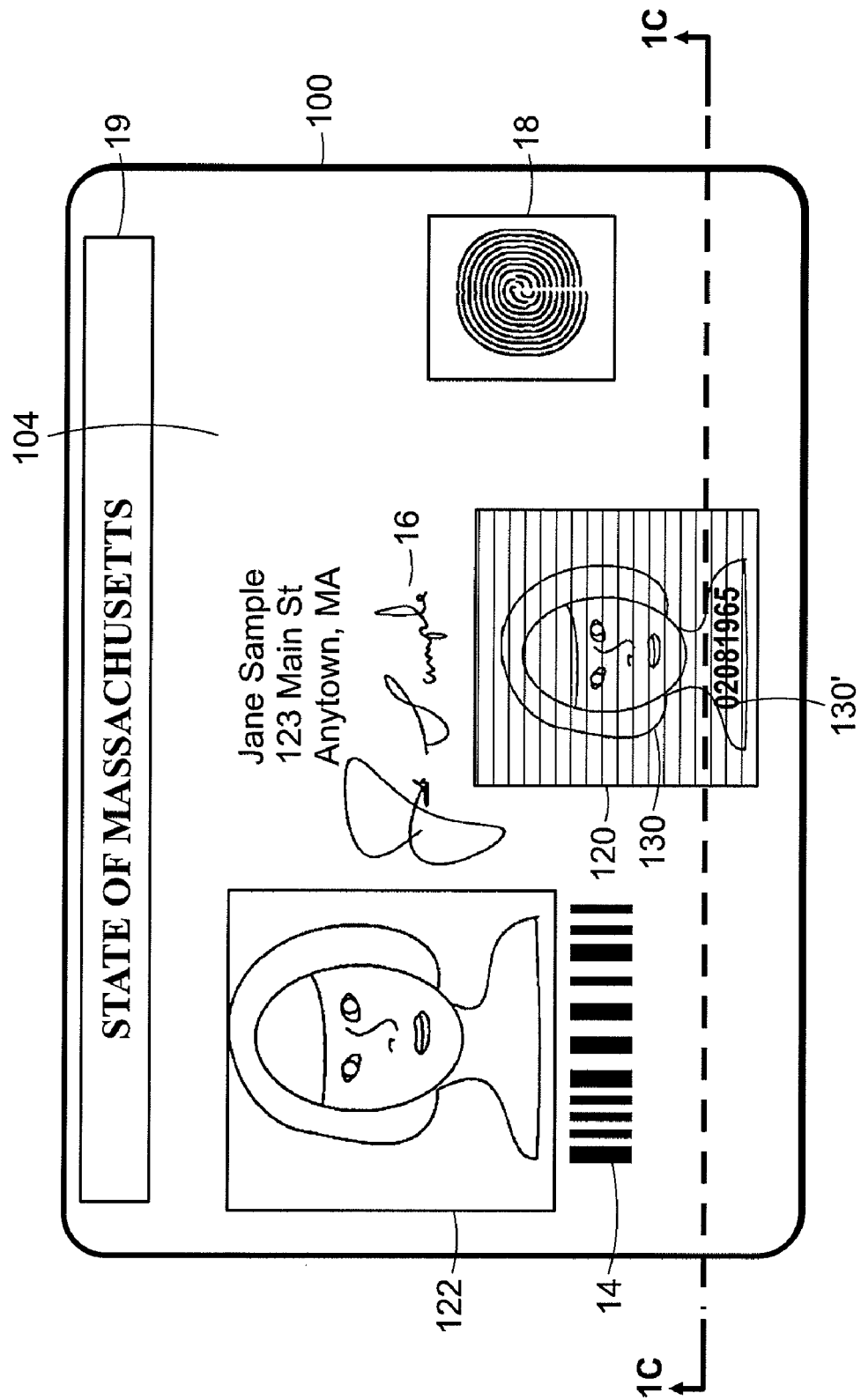
FIG. 3 is a view of an ID document illustrating the multiple images, in accordance with one embodiment of the invention.
Figure 4:
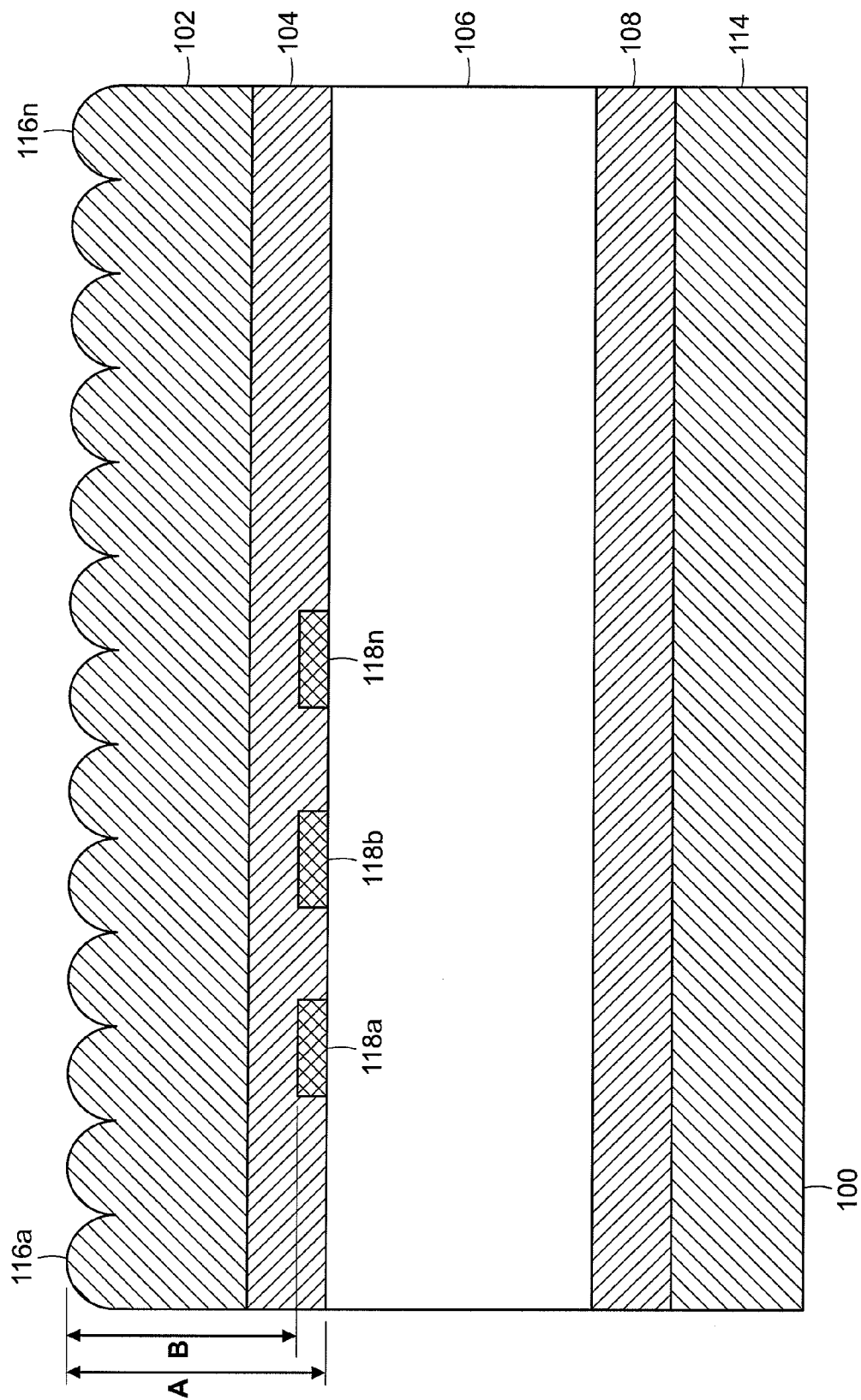
FIG. 4 is a cross-sectional schematic view of the ID document of FIG. 3, taken generally across line 1C-1C of FIG. 3.
Figure 5:
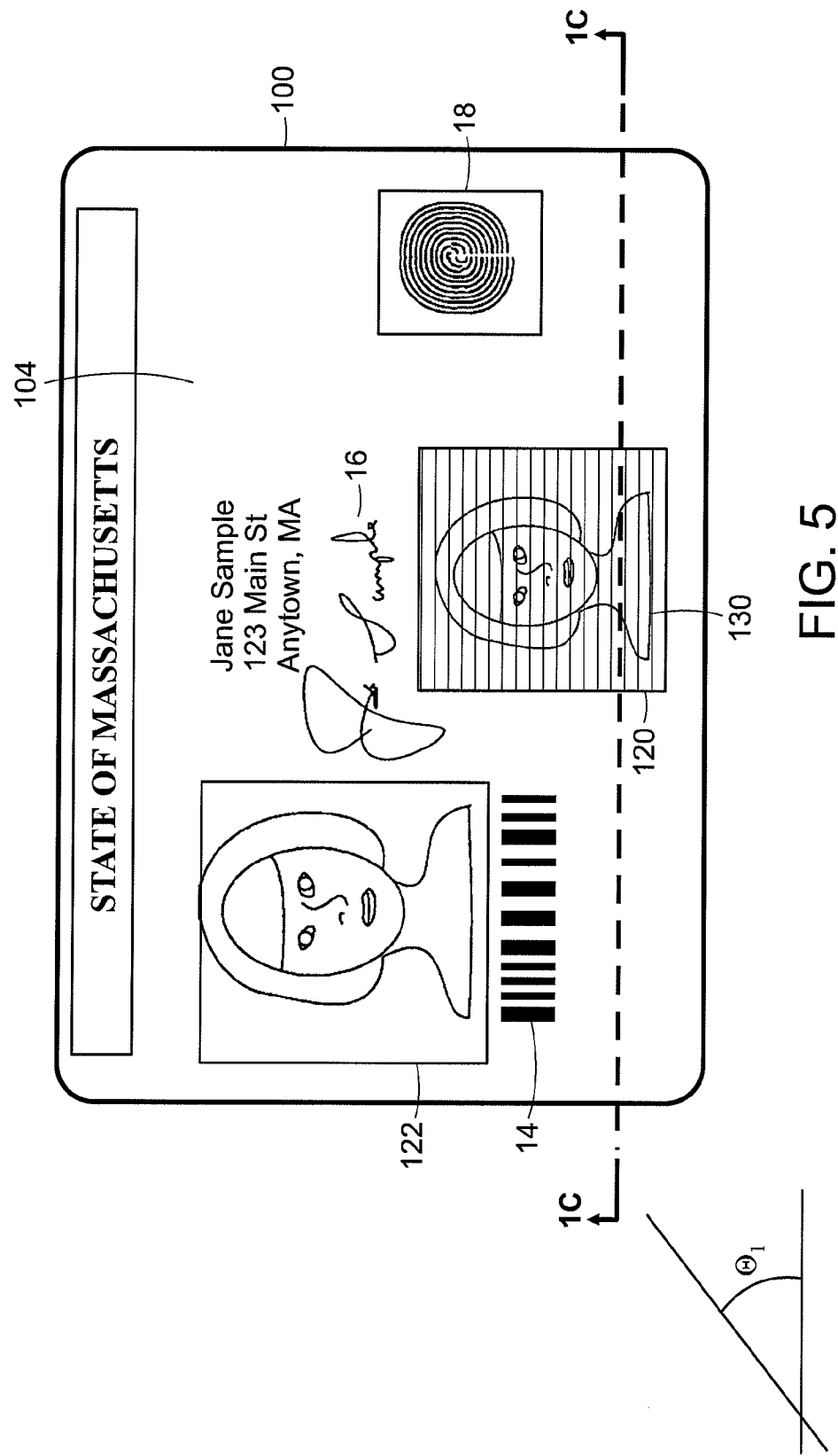
FIG. 5 is a top schematic view of the ID document of FIG. 3, viewed from a first angle.
Figure 6:
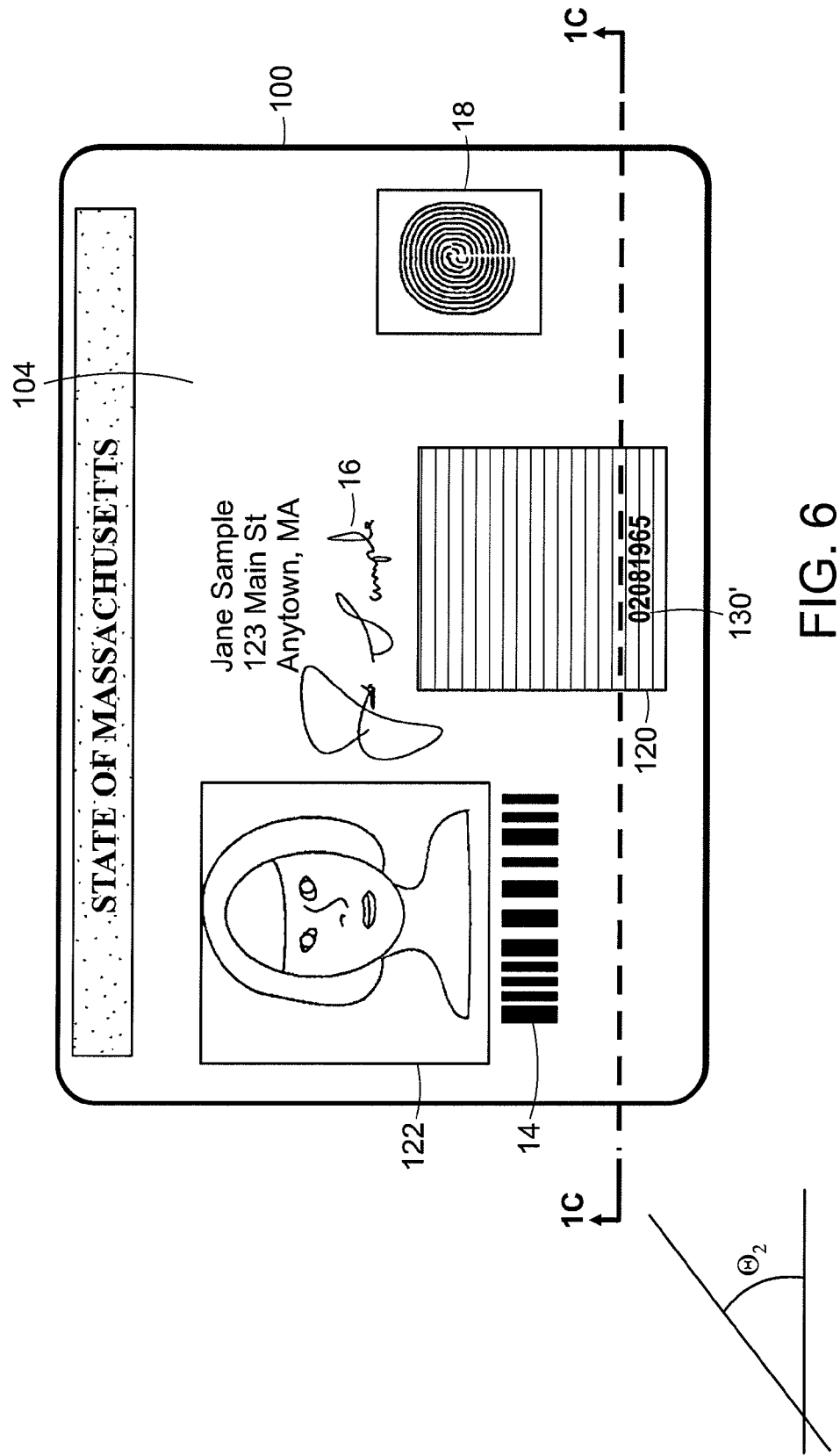
FIG. 6 is a top schematic view the ID document of FIG. 3, viewed from a second angle.

FIG. 3 is a view of an information bearing laminar assembly 100 (also referred to as ID card 100) illustrating the multiple images, in accordance with one embodiment of the invention, and FIG. 4 is a cross-sectional schematic view of the ID card 100 of FIG. 3, taken generally across line 1C-1C of FIG. 3. Note that the view of FIG. 3, in which both of the variable images are visible, is not a view that necessarily can be seen by a user, but is merely provided to illustrate the juxtaposition and location of the multiple images. As the ID card 100 is rotated, the security images 130, 130' appear to "disappear" as shown in FIGS. 5 and 6. The disappearance of the image is due to the focus of the lens in the areas of no print. As the ID card 100 is rotated about its horizontal axis, the focal point of the lens moves vertically up or down and oscillates between the two images. The lens feature magnifies the print located at this focal point, resulting in expanding the print to appear as a continuous single image. In at least one embodiment, instead of lines, individual dots (e.g., of ink or toner) could be used to represent the line and the feature would work in the same manner.

Referring to FIGS. 3 and 4, the ID card 100 includes an information-bearing layer 106 having a first surface 104. The first surface 104 includes a multiple image portion 120 which further includes first and second security images 130, 130'. For illustrative purposes only, the first security image 130 is shown as a reduced size portrait 130 (which, for security purposes, can match the standard size portrait 122), and the second security image 130', is shown to be a birthdate. The first and second security images 130, 130' can, however, be virtually any type of information that is useful and/or usable, given the type and use of the ID card 100. For example, the first and second security images 130, 130' can be any pair chosen from information such as biometric information (e.g., fingerprint), signatures, birthdates, serial numbers, government identification numbers (e.g., Social Security Numbers), images of the bearer of the ID card 100, address, account number, security classification, expiration date, and the like. Although it is advantageous for security purposes that one or both of the first and second security images 130, 130' include variable/personal information, in at least one embodiment it is not necessary that either (or both) security images comprise variable information. In one embodiment, for example, the first and second security images 130, 130' could comprise nonvarying information, especially if the nonvarying information is printed using a substance (e.g., optically varying or non-visible ink) that increases the difficulty of copying the ID card 100. In one embodiment either or both of the security images could comprise pre-printed fixed or nonvarying information. Furthermore, those skilled in the art will appreciate that many different types of information (in fact, virtually any type of information) is usable. For example, in one embodiment of the invention, either or both of the security images are color images, such as single color images, pearlescent colors, rainbow colors, multicolors, and full colors.

Note that the invention is not limited to using any specific inks or equipment to print any of the features, including the interlaced images described herein. Inks such as ultraviolet (UV), infrared (IR), etc. are usable in at least some embodiments of the invention, as well as inks that are toner-based and/or UV-curable. Further, in at least some embodiments of the invention, the equipment and/or printing presses used can include offset, digital variable offset, inkjet, laser toner-based, etc.

It also will be appreciated that the first and second security images 130, 130', in at least some embodiments, can even comprise the same image or different forms of the same image. For example, the first security image 130 could be a front facing portrait of a card bearer and the second security image 130' could be a profile image of the card bearer. In at least some embodiments, the first security image 130 could be a visible portrait image of a card bearer and the second security image 130' could be the same portrait image of the card bearer, but printed in a non-visible ink (e.g., UV or IR ink) or an optically variable ink. Many different possible combinations are contemplated to be within the spirit and scope of the invention.

Referring again to FIGS. 3 and 4, the first surface 104 also can include other information, such as fixed information 19 (here, the name of the issuing authority) and variable/personal information, such as, a portrait 122, an address 16 and biometric information 18. Note that any or all of the variable/personal information could be part of the multiple image portion 120.

FIG. 5 is a top schematic view of the ID document of FIG. 3, viewed from a first angle, showing that only the first security image 130 is visible at the first angle. FIG. 6 is a top schematic view the ID document of FIG. 3, viewed from a second angle, showing that only the second security image 130' is visible at the second angle.

Referring again to FIG. 4, it can be seen that the information-bearing inner layer 106 is disposed beneath a light transmissive outer laminate layer 102 having lenticules 116a through 116n formed thereon. The lenticules 116 and laminate layer 102 together form a lenticular lens. At time, in this specification, "lenticule" and "lenticular lens" may be used interchangeably. The illustrative embodiment of FIG. 4 illustrates that the information bearing inner layer 106 is interposed between two light transmissive outer layers 102 and 114, but not all embodiments of the invention require that there be light transmissive outer layers affixed to both surfaces of the information bearing inner layer 106.

In at least one embodiment, the information bearing inner layer 106 corresponds to a core layer (also referred to as a substrate) of an identification document. In at least one embodiment, the information bearing inner layer 106 is made from a substantially opaque material, such as TESLIN. Other rigid or semi-rigid planar materials can, of course, be used. Further, it will be appreciated that the invention can be adapted to work with many other materials used as an information bearing layer 106, such as thermoplastic, polymer, copolymer, polycarbonate, fused polycarbonate, polyester, amorphous polyester, polyolefin, silicon-filled polyolefin, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene terephthalate (PET), PET-G, PET-F, polybutylene terephthalate PBT), acetal copolymer (POM), polyetherimide (PEI), polyacrylate, poly(4-vinylpyridine, poly(vinyl acetate), polyacrylonitrile, polymeric liquid crystal resin, polysulfone, polyether nitride, and polycaprolactone, and combinations thereof.

In the illustrated embodiment of FIG. 4, the two illustrated light-transmissive outer layers are adhered to the inner information-bearing layer 106 by two adhesive layers 110 and 112, respectively. The adhesives layers 110, 112 need not be provided separately, but could be already formed on the laminate layer 102. The first outer light-transmissive layer 102 is adhered to the inner information-bearing layer 106 by the first adhesive layer 110 and the second outer light transmissive layer 114 is adhered to the inner information-bearing layer 106 by the second adhesive layer 112. The outer layer 102 includes a series of parallel lenticular lenses 116a-116n (generally referred to as lenticular lens 116) which are formed as described below in conjunction with FIGS. 11-17.

In at least on embodiment, some of the 118a-118n includes variable/personal information and is provided on the surface 104 of inner information-bearing layer 106 that is used in cooperation with the lenticular lenses 116, to provide the multiple image optical effect. In at least one embodiment of the invention, the information 118 includes interlaced images that include a color portrait (the creation of such images is discussed further herein). The information 118 also could includes text or graphics that is representative of data desired to be displayed in the information bearing document, or any type of personal/variable data discussed herein. For example, textual data may include, but is not limited to, the name, address, state, or privileges of the holder of the document. Graphical data may include, but is not limited to, such items as a photographic image of the holder (in black and white, grayscale, or color) of the information bearing document, the seal of the state or corporation issuing the document, a trademark, or other security such as a complex geometric pattern.

One of ordinary skill in the art will appreciate that information 118 other than security images could be similarly provided on any surface on information-bearing inner layer 106 or outer layers 102 and 108. In addition, information could also be provided on either adhesive layer 110 and 112. Similarly, one of ordinary skill in the art will appreciate, in light of the teachings provided herein, that the information on certain of these surfaces would require the information to be printed using a reverse format. Further, one of skill in the art will appreciate that the information 118 could be distributed among a plurality of layers that lie beneath the lenticular lens layer 116. Thus, this disclosure is not intended to be limited to providing the information in a particular orientation or to a particular surface.

In addition, the information may be provided on the desired surface using any known techniques. For example, affixing the information could include any process in which a marking material is applied to a substrate to generate a permanent mark. Thus, one skilled in the art will appreciate that the invention can be adapted for color and/or black and white printing techniques, such as photogravure, flexographic and lithographic printing, printing by means of ink jet printers (using solid or liquid inks), phase change printers, laser printing, laser engraving and electro photographic printing. For example, laser engraved information could be provided on surface 104 of inner information-bearing layer 106 creating another level of security. Persons skilled in the printing art will appreciate that with some of these printing techniques, the "inks" used need not necessarily be conventional liquid inks but also could be solid phase change inks, solid colors, dyes, etc. This disclosure is intended to include any means of affixing the information to a particular desired surface.

The optimal dimensions of the lenticular lens formed by the laminate 102 and its lenticules 116a-116n for viewing the information 118 are at least in part dependent on and adapted to suit the thickness of the laminate layer 102, the thickness of the information printed 118, and the expected focal length with which the information 118 is to be viewed. For example, in an embodiment of the invention having a standard 30 mil thick identification card with D2T2 printing of variable information to a TESLIN core, which is to be viewed by a human at a distance of about one to two feet, the focal length is about 0.015 inches and depends on the distance between the edge of the lenticular lens and the information 118 printed on the core. In FIG. 4, the range of distances to consider is illustrated as "A" and "B" range from about 10 to 20 thousandths of an inch.

The number of lenticules 116 per inch ranges, in at least one embodiment of the invention, between about 45 to 100 lines per inch. As those skilled in the art will appreciate, the number of lenticules 116 required depends at least in part on the resultant size of the multiple image feature to be created, the number of images being interlaced to form it, and/or the desired "flipping" (e.g., gradual or quick) between and among the multiple images.

The lens 116 is preferably transparent at least where the underlying information 118 can be viewed. Underlying information 118 can be any information printed on the information bearing layer 106 or on any layers disposed between the information bearing layer 106 and the lens 116. Therefore, each document can be personalized for the cardholder. As is understood by those skilled in the art, the design of the lens 116 dictates the degree of rotation the ID card 100 needs for viewing the information. By rotating the ID card 100, the first and second security images 130, 130' appear to a viewer to appear and disappear.

In one embodiment, lens 16a is designed to require a rotation of the ID card 100 to order to view the underlying information. Rotating the ID card 100 causes the underlying information to seem to appear and disappear as viewed through the lens 116, as shown in FIGS. 5 and 6. As will be described herein, the technique of printing the interlaced image on the information bearing layer 106 (e.g., a core layer in an identification card) instead of on the lens (formed by the laminate layer 102 and lenticules 116), enables the interlaced image to be printed with variable color information, if desired.

The lenticules 116 of FIG. 4 can be achieved in several ways, including by embossing the laminate material 102 after it is laminated to the information bearing layer 106 (which is described more fully in FIGS. 11-17), and by using a purchased lenticular lens sheet, such as one provided by Orasee Corporation of Duluth, Ga. The lenticules 116 can be achieved with any optical thermoplastic material including but not limited to polycarbonate, polyester, polyurethane, cellulose acetates, polystyrenes, polyvinyl chloride, and polyethylene. In at least one embodiment, the embossing process does not induce any crystallinity or marring of the surface. Some polyester materials show low levels of crystallinity during the embossing process. Generally, this can be overcome by processing conditions, but if crystallinity ensues the optical properties could be sacrificed by the reduction in transmission. Advantageously, the outer layers 102 and 114 are substantially optically clear within the visible spectrum. A suitable material is an amorphous polyethylene terephthalate (also referred to as "PET") sheet 34, for example, the PET sheet sold by Transilwrap, of Franklin Park, Ill. under the trade name "TXP." In general, PET material has good strength and flexibility and has high anti-abrasion properties. Other suitable materials include like polyesters, which are the reaction products of the polymerization of ethylene glycols with polycarboxylic acids.

For adhesive layers 104 and 108, in at least one embodiment of the invention a usable adhesive material is an ethylene-vinyl acetate adhesive such as KRTY, which is the commercial trade designation for an adhesive available from Transilwrap. Other heat- or pressure-activated adhesive can of course be utilized, the selection thereof depending on the nature of the processes by which the inner-information bearing layer 106 is to be coupled to the outer protective layers 102 and 114. For a heat-activated adhesive, one can employ an ethylene ethyl acrylate copolymer of an ethylene ethyl acrylate or mixture thereof, as well as any of a number of polyolefinic hot melts.

Figure 7B:
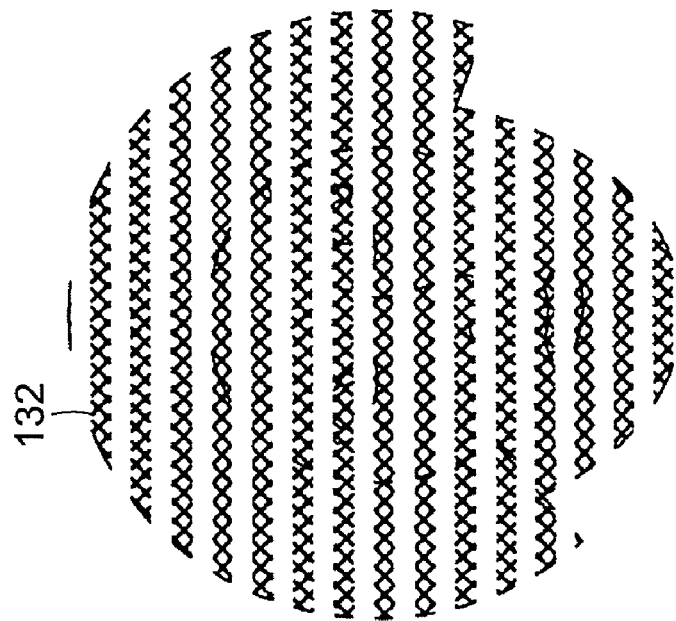
FIGS. 7A-B are illustrative examples of a first security image, in original and pre-interlaced form, respectively, relevant to the creation of a multiple image security feature shown in the ID document of FIG. 3.
Figure 7A:
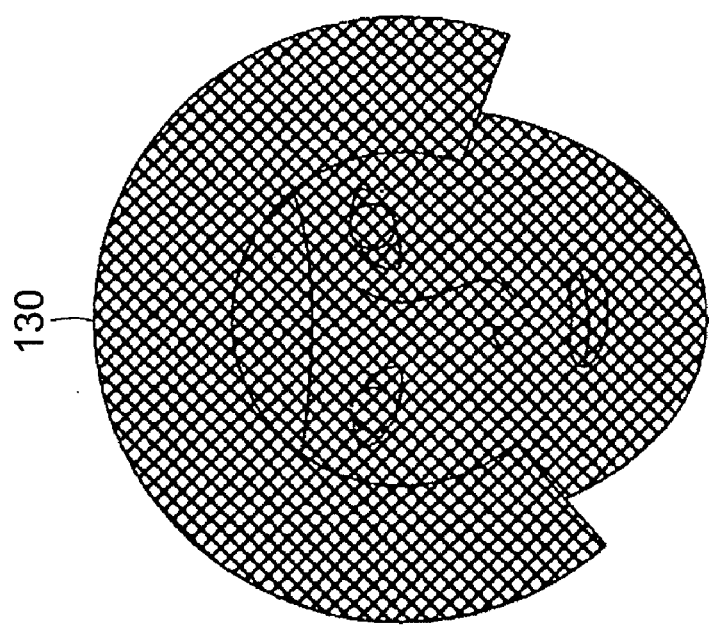

FIGS. 7A-B are illustrative examples of a first security image, in original and pre-interlaced form, respectively, relevant to the creation of a multiple image security feature shown in the ID document of FIG. 3. FIG. 7A shows a first security image 130 (the cross hatches shown are for illustrative purposes and do not necessarily represent what is shown in an image) before interlacing. FIG. 7B illustrates what is here termed a pre-interlaced first security image 132, representing the portion of first security image that is to be interlaced. The pre-interlaced first security image 132 is not necessarily an image that is separately created. Rather, the pre-interlaced first security image 132 represents one example showing the parts of the first security image 130 that could be used to create an interlace image that could be placed as information 118 on an ID card 100 that is viewable through the lenticules 116 affixed to the card (See FIGS. 3-6).

Figure 8A:
FIGS. 8A-8B are illustrative examples of a second security image, in original and pre-interlaced form, respectively, relevant to the creation of a multiple image security feature shown in the ID document of FIG. 3.
Figure 8B:

FIGS. 8A-8B are illustrative examples of a second security image 130', in original and pre-interlaced form, respectively, relevant to the creation of a multiple image security feature shown in the ID document of FIG. 3. FIG. 8B is similar to FIG. 7B in that it illustrated a pre-interlaced second security image 132', representing the portion of the second security image that is to be interlaced. The pre-interlaced second security image 132' is not necessarily an image that is separately created. Rather, the pre-interlaced second security image 132' represents one example showing the parts of the second security image 130' that could be used to create an interlace image that could be placed as information 118 on an ID card 100 that is viewable through the lenticules 116 affixed to the card (See FIGS. 3-6).

Figure 9:
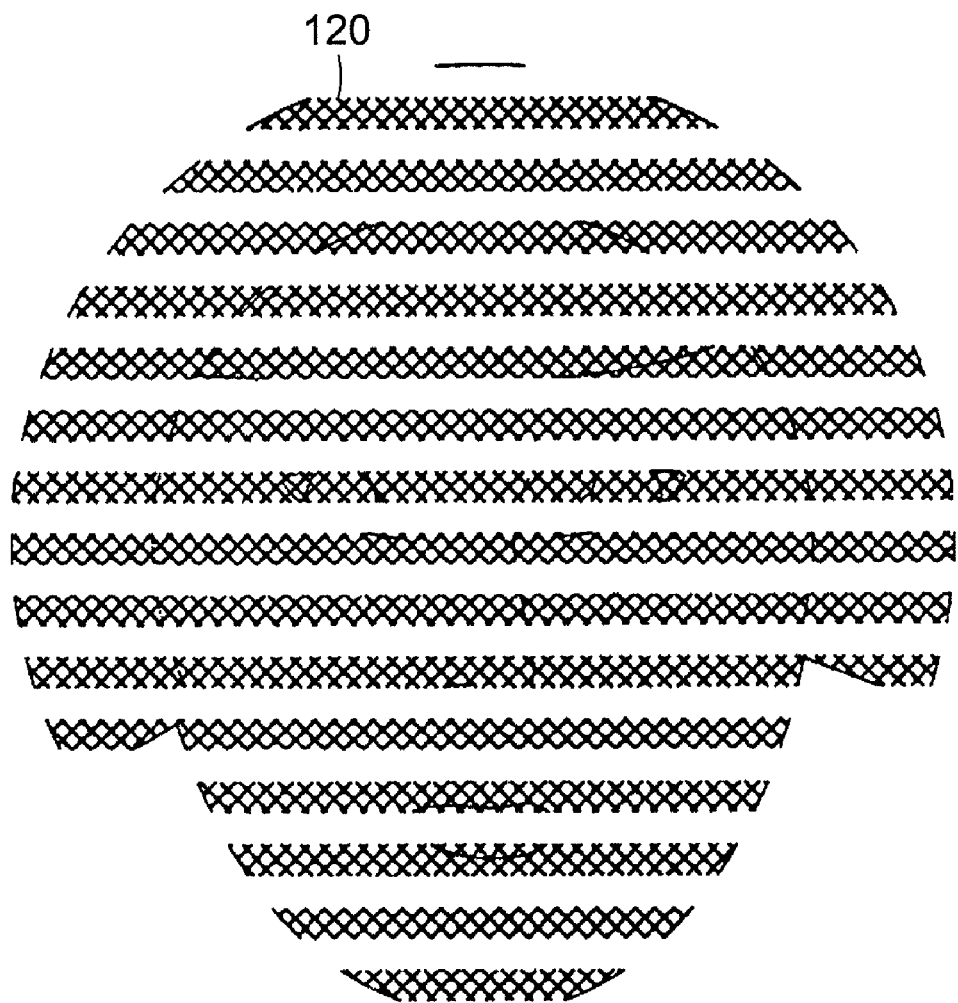
FIG. 9 is an illustrative example of a multiple image security feature created by interlacing the first and second security images of FIGS. 7A, 7B, 8A, and 8B, in accordance with one embodiment of the invention.
Figure 10:
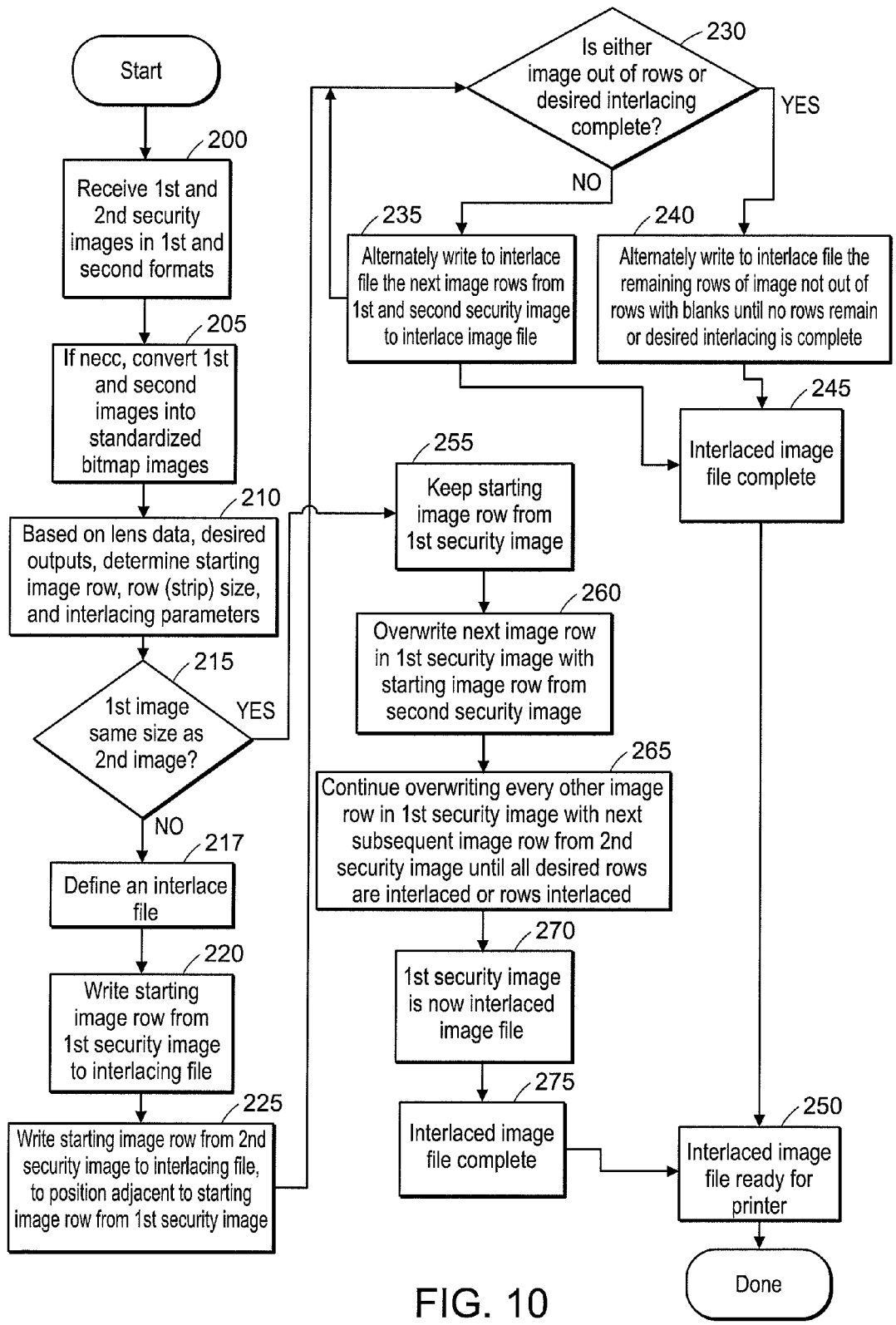
FIG. 10 is an illustrative flow chart showing a method for creating the multiple image security feature of FIG. 9, in accordance with one embodiment of the invention.

FIG. 9 is an illustrative example of a multiple image security feature created by interlacing the first and second security images of FIGS. 7A, 7B, 8A, and 8B, in accordance with one embodiment of the invention, in the manner contemplated by the flow chart of FIG. 10, which is now described.

FIG. 10 is an illustrative flow chart showing a method for creating the multiple image security feature 120 of FIG. 9, in accordance with one embodiment of the invention. Although this flow chart describes the process for creating a multiple image security feature 120 that is made from two security images, those skilled in the art will appreciate that this method readily can be adapted to interlace more than two images. In addition, although the term "security image" is used in this discussion by way of example, it is not limited to including just image type files, but also characters/strings.

In step 200, the desired first and second security images are received (step 200) for this process. The security image can be virtually any type of image or data. For example, in at least one embodiment, the security image is a string of one or more characters, such as a birthdate. The string can be in any font or color, and can include fixed and/or variable information. The string can be supplied in many ways, such as from a database, entered by hand, or extracted from a file.

In at least one embodiment, the security image is part of an image that was captured from a subject, such as a facial portrait, a fingerprint, or a signature. For example, in at least one embodiment, several pieces of such information about a subject can be stored in an object file that is usable as a security image input. In one embodiment, the method of FIG. 10 receives information in the form of a personal object file called a .poff file (formerly known as a POLAROID object file). The following provide some further information about the .poff file format used in accordance with at least some embodiments of the invention POFF Files This file format is designed to encapsulate all the data needed to process an individual ID card. All the data needed to print and handle the card will be included in the file. This permits this file to be shipped as an entity across a network where it can be printed, displayed or verified without need for additional information. The specific fields and their order in text area are not specified, there is a provision for a separate block of labels for the fields for display purposes. The format is suitable for encoding on 'smart cards' as well as transmission and printing of the records.

The image file formats were chosen for their compatibility with the AAMVA standards and for their widespread acceptance as file formats in popular applications and libraries.

Notes:

AAMVA (American Association of Motor Vehicle Administrators) has begun work on a transmission standard for Image/Text data and is revising its best practices guide for image storage format. This format may have to be revised to conform with this new standard.

The AAMVA baseline standard for signatures is currently 8 bit grayscale (JPEG compressed), the standard also supports bi-level with CCITT group 3 or 4 as an accepted alternate. It needs to be determined with of these formats is preferred by the marketplace.

Typical US DMV Files Contain the Following Blocks
    Text Block (tag 0x0001)
    JPG Portrait Block (tag 0x0011 or tag 0x0211)
    ID-3000 or TIF Signature Block (tag 0x0420 or 0x0520)
    They may optionally include fingerprint blocks File Format

| Header | |
|---|---|
| POFF | 4 byte literal |
| Version | 2 byte unsigned integer |
| | (high byte major version low byte minor version) |
| Object Count | 2 byte unsigned integer |
| File Length | 4 byte unsigned integer |
| Directory Area | |
| Directory Checksum | 4 byte unsigned integer |
| Object Type Tag | 2 byte unsigned integer [Beginning of directory] |
| Length of Object | 4 byte unsigned integer |
| Offset of Object | 4 byte unsigned integer [from beginning of file] |
| . . . | additional directory entrys |
| End of Directory Tag | |
| Data Area | |
| Object Type Tag | 2 bytes [Included in length of object] |
| Object Checksum | 4 bytes |
| Object Data | |
| . . . | additional data sections |

Checksums are the 32 bit unsigned integer sums of all the bytes in the checksum range, for data sections the checksum range is all the bytes that follow the checksum until the next object tag, for the directory area the checksum range is all the individual directory entrys (the length should be 6 times the object object count). The length in the header is the length of the original data object (it does not include the tag an the checksum).

Standard DMV File Layout
    Header.
    Directory
    Text Data
    Portrait
    Signature Data Formats
    All numeric values are in Intel x86 format (byte order)

Color Images
    Primary Format
    .JPG (JPEG File Interchange Format)
    Alternate Formats
    .TIF (JPEG Compresessed TIFF)
    ID-3000 Version 2.2+ Compatible format with marker codes B+W Images
    .PCX (CCITT Group 3 or 4 Compatible Modes)
    .JPG (8 bit grayscale JFIF compressed)
    .TIF (Any B&W or Grayscale TIFF 6 Compatible File Format)

Text Data (or Labels)
    .CSV (comma separated value)
    A comma as data is represented by ESC, or by single quoting field
    Two commas together indicates a blank field
    All other characters must be printable ASCII Text (32-126, 128-254)

Data Tags (16 Bits Unsigned Integer)

| Text | 0x0001 | |
|---|---|---|
| Text Field Labels | 0x0002 | |
| Double Byte Text | 0x0101 | (for use with Asian character sets) |
| Double Byte Labels | 0x0102 | (for use with Asian character sets) |
| Front Portrait | 0x0011 | JFIF (JPG File format) |
| Left View Portrait | 0x0012 | JFIF (JPG File format) |
| Right View Portrait | 0x0013 | JFIF (JPG File format) |
| Front Portrait | 0x0111 | TIFF |
| Left View Portrait | 0x0112 | TIFF |
| Right View Portrait | 0x0113 | TIFF |
| Front Portrait | 0x0211 | ID-3000 |
| Left View Portrait | 0x0212 | ID-3000 |
| Right View Portrait | 0x0213 | ID-3000 |
| Signature | 0x0020 | Bi-Level PCX (group 3 or 4) |
| Signature | 0x0120 | Grayscale (JFIF Compressed) |
| Signature | 0x0220 | Grayscale (JTIF Compressed) |
| Signature | 0x0320 | ID-3000 Grayscale |
| Signature | 0x0420 | ID-3000 Binary |
| Signature | 0x0520 | TIFF (any TIFF 6.0 type) |
| Bitmap Fingerprint Data | | |
| Right Thumb | 0x0030 | |
| Right Index Finger | 0x0031 | |
| Rignt Middle Finger | 0x0032 | |
| Right Ring Finger | 0x0033 | |
| Right Little Finger | 0x0034 | |
| Left Thumb | 0x0038 | |
| Left Index Finger | 0x0039 | |
| Left Middle Finger | 0x003A | |
| Left Ring Finger | 0x003B | |
| Left Little Finger | 0x003C | |
| Minutae Fingerprint Data | | |
| Right Thumb | 0x0130 | |
| Right Index Finger | 0x0131 | |
| Rignt Middle Finger | 0x0132 | |

| | |
|---|---|
| Right Ring Finger | 0x0133 |
| Right Little Finger | 0x0134 |
| Left Thumb | 0x0138 |
| Left Index Finger | 0x0139 |
| Left Middle Finger | 0x013A |
| Left Ring Finger | 0x013B |
| Left Little Finger | 0x013C |
| Digitial Signature Tags | |
| CRC Method | 0x0040 |
| Polaroid Bingo Method | 0x0041 |
| Datastream Tags | |
| PDF-417 Barcode Data | 0x0050 |
| End of Directory | 0x00FF |
| User Definable Tags | 0xFFxx (where xx is 0x00-0xFF) |

The Tag Patern 0x0Fxx is reserved for special operations.

Notes on Tag Types

The Digital signature tags are for improved file security. The system is a compromise between encrypting the actual data elements, and leaving the data unsecured. A Digital signature object contains a Digital Signature structure (defined elsewhere) that includes information about the specific object it protects. The original object is unchanged by the method, an application which wishes to validate the authenticity of an object builds the signature for the object and compares it to the value stored in the field.

The Datastream tags are used to represent data that is passed into the system for special purpose processing. They are used when the higher levels of the system do no have the ability to make sense of the data contained. An specific example of this would be when encrypted data is being passed in the system for printing as a barcode.

Now referring again to FIG. 10, virtually any type of pairing of different (or similar) types of files are possible with the pair of first and second security images. For example, in one embodiment, the first and second security images comprise a string (e.g., characters representing date of birth) and part of a personal object file, such a portrait image. In one embodiment, the first and second security images comprise a pair of personal object file data, such as a portrait and a signature. In at least one embodiment, the first and second security images comprise a personal object file data (e.g., a fingerprint image) and a standalone image, which could be a supplied image (e.g., a state seal or logo). Any of the information (strings, object files, images) can be fixed or variable, and those skilled in the art will appreciate that different types of cards will have differing security needs and, thus, may require different types of pairs of images.

Referring again to FIG. 10, if the first and second security images are not already in a predetermined standard size and bitmap form, the first and second security images are converted (step 205) to bitmap type files of a standard size. The size is dependent on the desired physical size of the multiple image feature on the card. In one embodiment, a software product usable to accomplish the conversion into a standard bitmapped image is the LEAD TOOLS 12.0 FOR WINDOWS 32 product available from Lead Technology, Inc., of Charlotte, N.C.

In step 210, an image row in the image is selected as a starting point to begin the interlacing. The image row can comprise of, for example a single row of pixels or can, for example, be multiple rows of pixels. The size of the image row depends on various factors, such as the design of the lens (e.g., lens dimensions), lens features (e.g., lenticules per inch), the size of the first security image, the size of the second security image, the degree of switching (fast or slow) between images that is desired, focal length, and surface quality.

For example, assume that a lenticular lens formed on the laminate 102 (FIG. 3) has about 90 lenticules (also referred to as "lines") per inch ("lpi"). It is assumed, for the purposes of this example, that the lenticules are oriented so that they are horizontally aligned over a security image, although such an orientation is not limiting. In this same embodiment, the first security image may have a size of 450 pixels long by 450 pixels wide, with each pixel (assume square pixels) being about 0.0011 inches along in length along each side—an image about a half inch long and a half inch wide. For an image with those dimensions and a lenticular lens formed in laminate 102 having 90 lenticules per inch (or 45 lenticules per half inch), there will be a lenticule about every 0.011 inches, or about every 10 pixels. Thus, one type of interlacing for the security image is to alternate every 10 pixels (e.g., 10 pixels "on" in the image, 10 pixels "off" for a first security image, and the reverse for the second security image). The inventors have determined, however, that the optimum interlacing for the security images used in ID documents is a 5 pixel on, 5 pixel off configuration. Referring again to step 210 of FIG. 10, the so-called row size would, in this example, be 10 pixels.

To determine a starting image row (that is, the row in the image where the method begins will begin the "on-off" interlacing, the method of FIG. 10 uses a one or more predetermined input parameters. In one embodiment, a user may have a choice, for example, of setting the interlacing to begin at the top of an image and work down, at the bottom and work up, somewhere in between and work up or down. This is, in one embodiment, a fixed parameter for all identification documents being manufactured in a given "batch" for example.

It is anticipated that the invention can be adapted to be able to determine the starting image row dynamically, based on the type and/or size of the first and/or second security images. For example, assume that the first security image is a full color image portrait having a first size and the second security image is a text string that can vary from user to user (e.g., an address) and thus may have a different "height" for different users (assuming that the text string could "wrap around" to fill the available image space. The method of FIG. 10 and particularly step 210 can be adapted to select a starting row for interlacing depending on the "height" of the second security image, to best provide a substantially complete interlacing between the first and second security images. Note also that varying the starting row can cause the image flip angle (or the viewable angle) to change.

Although not specifically addressed in the exampled discussed in connection with FIG. 10, step 210 of FIG. 10 also takes into account parameters such as desired size of resultant final interlaced image and desired fonts and font colors of any characters printed as part of final interlaced image. The font colors can include single colors, multiple colors, rainbows of colors, pearlescent colors, full colors, and the like, as desired.

In step 215 of FIG. 10, if the first and second images are the same size, the processing moves to step 230 (discussed below). Note that, in at least one embodiment, two images being the same "size" implies that the two images have the same height and width (in pixels). In this embodiment, if the first and second security images are not the same size, the interlaced image is created in a different file, but if the first and second images are the same size, the interlaced image is created by directly interlacing into one of the images (for purposes of example, we assume that image to be the first security image, but using the second works equally well).

Generally, for images of unequal size, the smaller image is interlaced into the larger image.

If the first and second security images are different sized, an interlace file is defined (step 217) and the interlaced data is written to it from the first and second security images. The interlace file has a bitmap format. This begins by writing the desired starting image raw from the first security image to the interlace file (step 220). For example, if the first security image corresponded to the 450 by 450 example described above, the starting image row could be the first 10 rows of pixels in the first security image. Next, the desired starting image row (also, in this example, 10 rows of pixels) is written from the second security image (step 225). In one embodiment, this row is written in the interlace file to position directly adjacent to the row just written from the first security image. As shown in steps 225, 230, and 235 this process is alternated back and forth from the first to the second security image until the desired amount of interlacing is complete or one of the images "runs out" of rows of pixels. Note that the method of FIG. 10 can be adapted so that only partial interlacing (e.g., interlacing for, say, 40 lenticules worth of image) is required, so the process of steps 225 through 235 can stop when the desired amount of interlacing is desired.

If one of the images is out of rows, the rows in the other image continue to be written to the interlace file, alternating with rows of "blanks", until there are either no rows of the image left or the desired interlacing is complete (step 240). In this embodiment, by "blank" it is meant that the other image will be overwritten with what ever background color (e.g., white, but need not be white) that the information bearing layer 106 is. The interlaced image file is then complete (step 245) and ready to be provided to a printer for printing on a card (step 250). In at least one embodiment, the resultant interlaced image file resembles the file shown in FIG. 9.

Referring again to step 215, if the first and second security images are the same size, it is not required to create a new interlaced image file (although in at least one embodiment it is contemplated that a new interlaced image file nonetheless can be created in a manner similar to that described in steps 217 through 250). Rather, one of the security images can be "turned into" an interlaced image file via steps 255 through 250. For purposes of example only, it is assumed here that the first security image is to be "turned into" the interlaced image file.

The starting image row in the first security image is retained (step 255) (note that starting image row and subsequent image rows are the same as defined above). The next image row in the first security image is overwritten with the starting image row from the second security image (step 260). This process continues (alternately overwriting the image rows in the first security image) until the desired degree of interlacing is achieved or all rows are interlaced (step 265). The resultant interlaced image will have a similar general appearance to the image of FIG. 9, but will show interlacing of two similarly sized images. As a result of steps 255 through 265, the first security image file has been converted to an interlaced image file (steps 270 and 275) and is ready to be printed on the substrate.

It will be appreciated by those of ordinary skill in the art that several print technologies including but not limited to indigo (variable offset) laser xerography (variable printing), offset printing (fixed printing) and inkjet (variable printing) can be used to print the information 118 (which can include the above mentioned interlaced image file) on the inner information-bearing layer 106. The information can be printed using dots or lines of varying colors to form text or images.

The information also can comprise process colors or pantone colors. The multiple image features, can include personal information in a color format.

Figure 11:
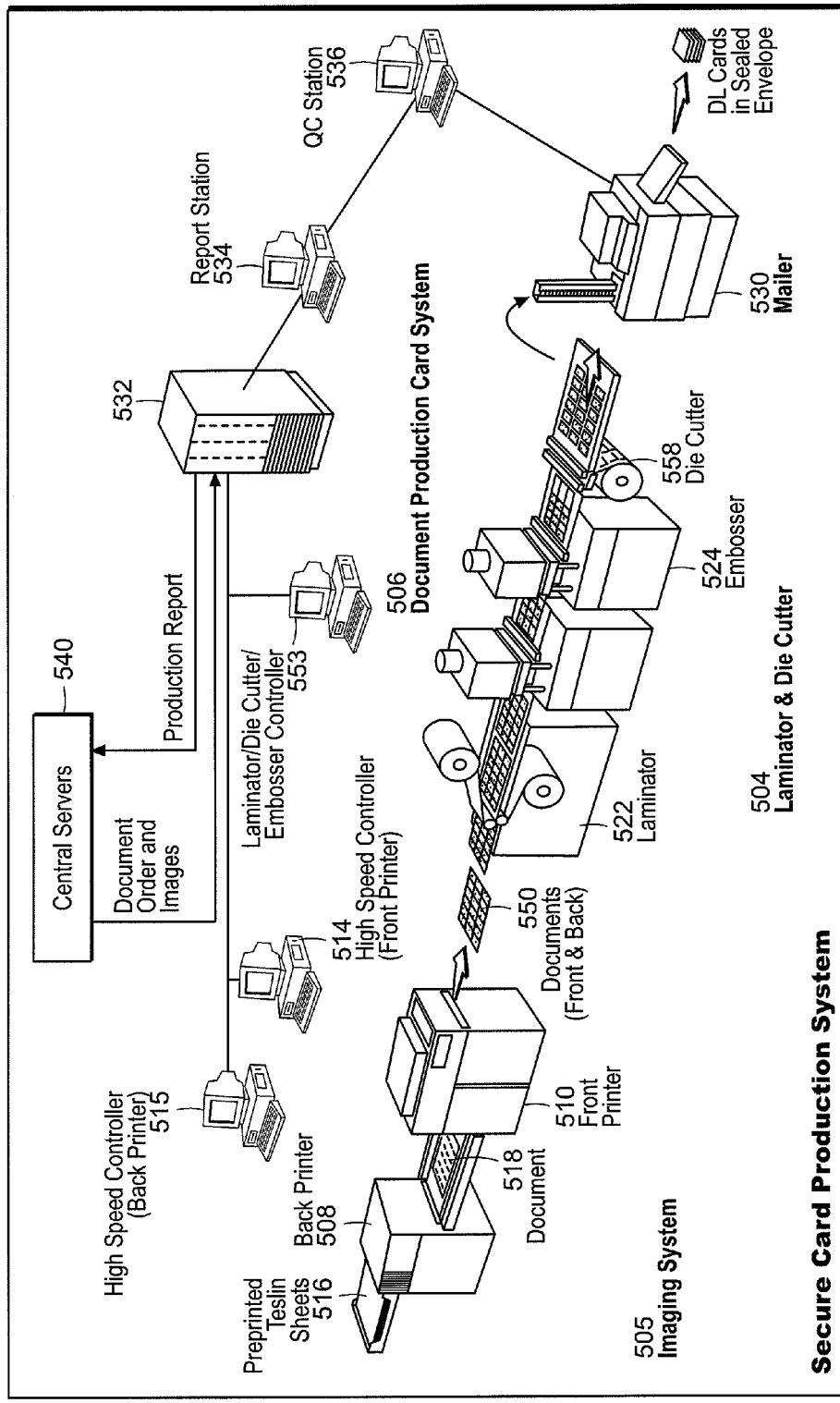
FIG. 11 is an illustrative diagram of a first central issue card production system that can be used to produce the ID document of FIG. 3, in accordance with one embodiment of the invention.

In one embodiment of the invention, the ID card 100 of FIG. 3 can be produced in a high volume central issue environment. FIG. 11 is an illustrative diagram of a first central issue card production system 500 that can be used to produce the ID document of FIG. 3, in accordance with one embodiment of the invention. The system 500 includes an imaging system 505, laminator and die cutter system 504, and a document production and control system 506.

The imaging system includes a back printer 508 for printing the back side of the card and a front printer 510 for printing the front side of the card. Each printer has its own high speed controller 514, 515. The laminate and die cutter system 504 includes a laminator 522, an embosser 524, a die cutter 558, and a laminator/die cutter/embosser controller 553. In one embodiment, the laminator/die cutter/embosser controller helps to implement the method of FIG. 10.

The document production control system includes central servers 540, a report station 534, a quality control station 536, and a mailer 530. The QC Station 536 and its associated bar code scanner (not shown) can be used by an operator to scan the bar code of a defective sheet or document. Keyboard entry can also be used to report or to check documents and sheets.

Production of the ID document begins at the Imaging System 505, where card substrates, such as preprinted TESLIN sheets 516, are fed into the back printer 508. The back sides of the TESLIN sheets 516 can be customized with desired information (e.g., restriction codes or other information unique to each document on the sheet). In addition, bar codes for tracking the documents through the production process can be added. As the TESLIN sheet enters the second section of the Imaging System 505, the front printer 510 prints appropriate portrait and signature images on the front of the documents based on personalized cardholder information stored in a file. The front printer 510 also prints the interlaced images (which, in one embodiment, comes from an interlaced image file accessible to the laminator/die cutter/embosser controller 553) on the front of the TESLIN sheets 516. Note that since a plurality of ID documents are being produced simultaneously, the front printer 510 can print an interlaced image file for each document onto the appropriate locations of the TESLIN sheets 516. The output of the front printer 510 are document sheets 550 printed on the front and back.

As completed sheets accumulate in the output hopper of the Imaging System 505, in one embodiment, an operator performs a visual inspection and transfers the completed sheets to the input hopper of the Laminating/Embossing/Die-Cutting System 504. Any sheets failing visual inspection can be brought to the QC station 536 where their bar code is scanned and production of a replacement automatically ordered. The failed sheets are then destroyed.

When the document sheets 550 are about to enter the Laminating/Embossing/Die-Cutting System 504, automatic scanners confirm that the front and back sheets 550 match, that sheets 550 have not stuck together, and that the sheets 550 are right side up. After the scanning process, the laminator 522 applies the desired laminate material (e.g., polyester) on both sides (front and back) material to all sheets to form a continuous web of laminated sheets. The embosser 524 then embosses the laminate to form the lenticules 116 (FIG. 3). In at least one embodiment, registration marks printed on one or both sides of the sheets 550 help to precisely orient the embosser 524 so that the lenticular lens feature is correctly formed on the interlaced images 120 printed on the sheets 550. More details about the embosser 524 are provided below.

Figure 12:
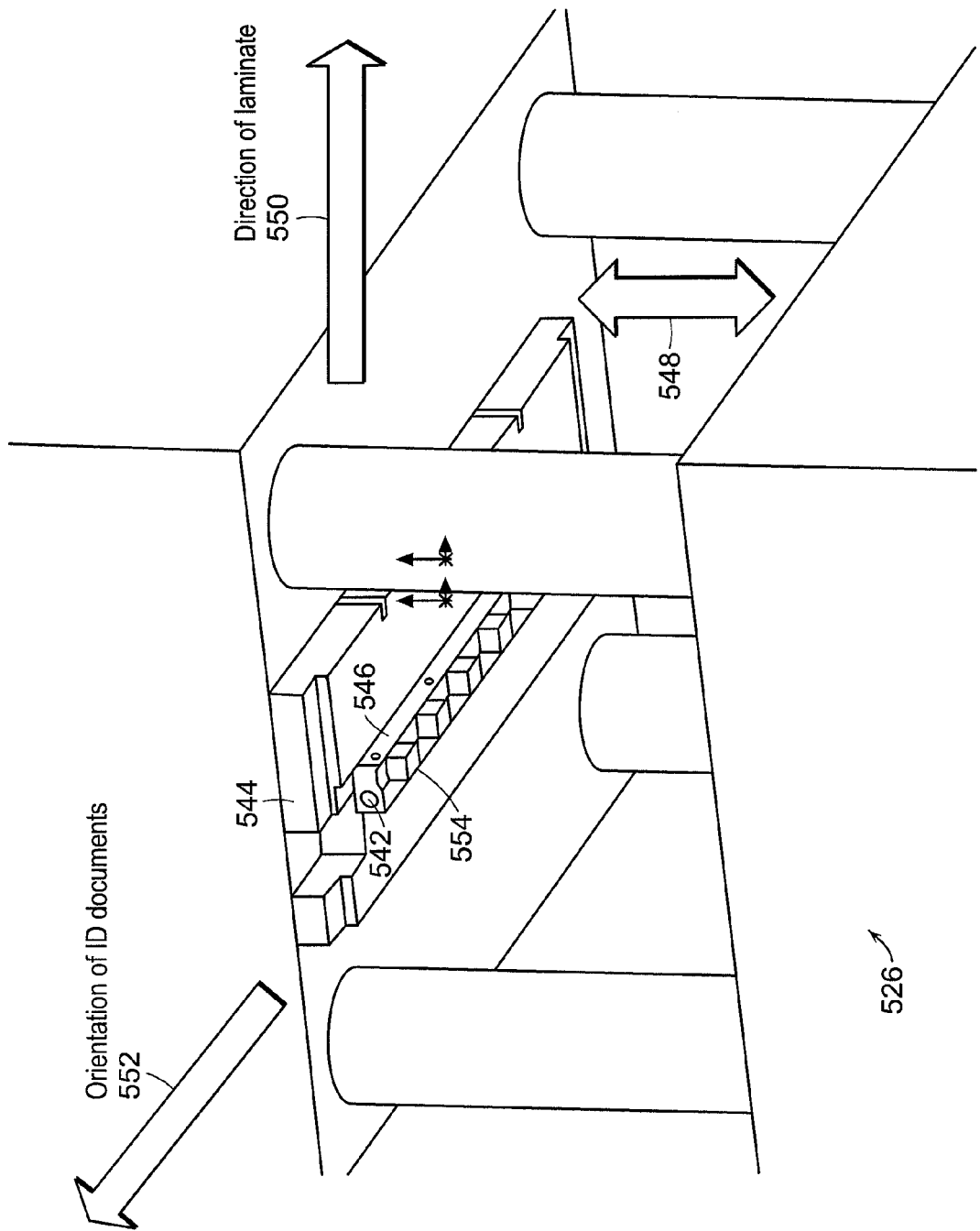
FIG. 12 is a detailed view of a portion of the embosser of FIG. 11.
Figure 13D:
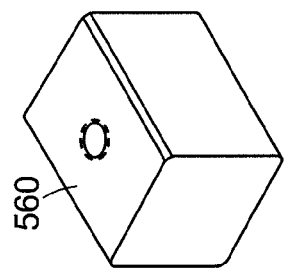
FIGS. 13A-D are front, cross-sectional, enlarged, and perspective views, respectively of the lenticular die of the embosser of FIG. 11.
Figure 13C:
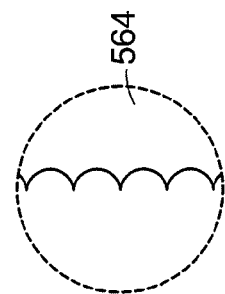
Figure 13B:
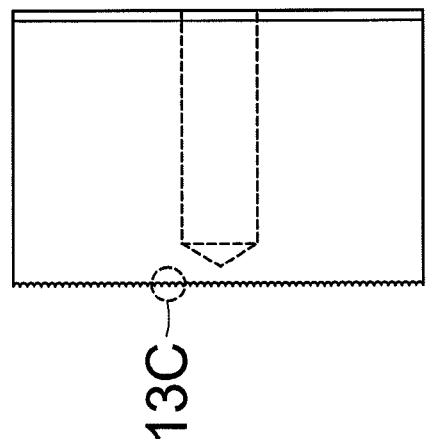
Figure 13A:
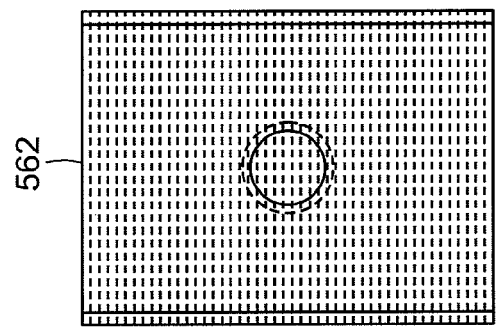
Figure 14C:
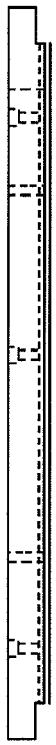
FIGS. 14A-D are cross-sectional, perspective, side, and edge views, respectively, of the insulator plate of the embosser of FIG. 11.
Figure 14B:
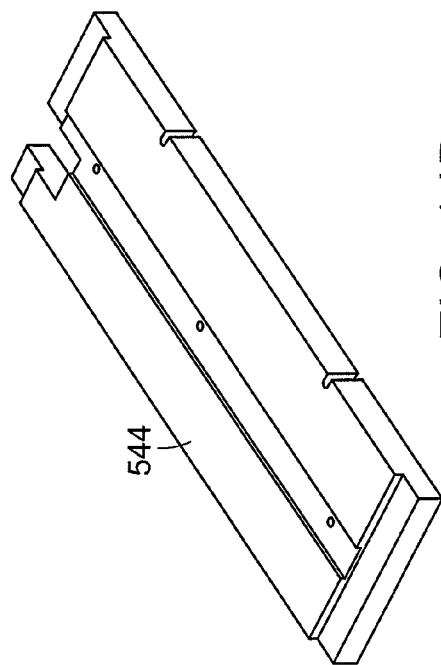
Figure 14D:
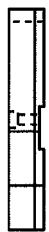
Figure 14A:
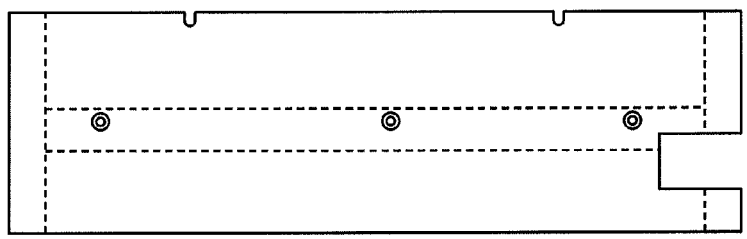

The web of laminated sheets leaves the embosser then passes into the die cutter 558, which cuts the sheet into individual documents. After the ID documents are produced and given a final quality control inspection, they are fed into the mailer 530. The mailer prints the applicant's address on the card holder and inserts the ID document into the holder. The holder is then inserted into an envelope for mailing FIG. 12 is a detailed view of the section 526 of the embosser 524 of FIG. 11. This detailed view shows that an embosser in accordance with one embodiment of the invention includes a plurality of lenticular dies 554, an insulator plate 544, and a heater bar 542 in the insulator plate. The heater bar 542 in the insulator plate helps to keep the die 554 laminate at a temperature suitable for the deformation necessary to produce lenticules during embossing.

Although not visible in FIG. 12, the embosser 524 is capable of up and down motion 548 to accomplish the embossing process (the techniques for doing this are not described here and assumed to be within the abilities of one skilled in the art). Various parameters, such as time, temperature, pressure, stroke of the press and die design, can be adapted to optimize the operation of embosser 524 for a given ID document, laminate, and lenticule size. For example, in one embodiment, when using polycarbonate materials, the embosser 524 uses a temperature of 425 degrees Fahrenheit for 5 seconds at a pressure of 20 PSIG (lb/in2 on the gauge) is used. When using a PET material a temperature of 275 degrees Fahrenheit for 5 seconds and a pressure of 20 PSIG is used. The stroke of the press is set so that the die 554 only enters the surface of the laminate so as to emboss the lenticules. If the stroke is too large then the card deformation will be excessive. Stroke time and temperature are interrelated because of a minimum amount of heat is required to form the lenses 116. The higher the die 218 temperature the lower the time required to form the lens and vice versa. Pressure and stroke of the press 216 are adjusted to minimize card deformation. Deformation can occur throughout the ID card 100 thickness and show on the back of the card or at the edges of the card. By optimizing these adjustments, these effects are reduced to make an acceptable ID card 100.

The plurality of lenticular dies 554 enable the embossing of a corresponding plurality of ID documents that pass through in the ID document orientation direction 552. Specifically, each lenticular die 554 is capable of creating a plurality of lenticules on the laminate that covers each interlaced image printed on respective ID document. In the embodiment shown in FIG. 12, there are 7 lenticular dies 554 that can substantially simultaneously emboss 7 different ID documents that are part of the printed sheets 550. It will be appreciated, however, that the laminator 524 of FIGS. 11 and 12 also could be adapted to emboss a single ID document at a time (e.g., with no subsequent die cutting), or to emboss documents passed through in a form other than sheets to be die cut, such as a 1 by n web (where n is the number of ID documents) passing through the embosser 524.

FIGS. 13A-D are illustrative top, cross-sectional, enlarged, and isometric views, respectively of the lenticular die 554 of the embosser of FIG. 11. The lenticular die 554 can be formed from many different materials, including metals, ceramics, composites, and the like.

The quality of the surface of die 554 can have a significant impact on the quality and "on off" effect of the lenticules that it forms. For instance, if a rough surface is generated from the manufacturing process of the embossing die 554, the rough surface could be transferred to the lenticular lens 116 and the functionality could suffer, accordingly. Note also that various machining processes can be used do create different depths of the sinusoidal patterns of the die 554 shown in FIG. 13(c). In one embodiment, an electrical discharge machining (EDM) processes are used make the die 218 having a surface roughness of #16 or better.

In one embodiment, the resultant lenticules formed by the die 554 can be improved by electroplating the die 554 with various materials such as TEFLON, Polyond, Ni-plating, Cu plating or Cr-plating. As those skilled in the art will appreciate, the plating depends on the die material and the compatibility of the plating material.

In one embodiment the die 554 can be plated then coated over the plating with a polytetrafluoroethylene coating to reduce, the adhesion of the die 554 to the laminate. Referring to FIGS. 3 and 13, the upper light-transmissive outer layers 102 material might require some mold release agents to prevent the die 218 from sticking to the ID card 100 after the embossing process. When the die 554, begins to ascend from the ID card 100 surface, the die 554 can adhere to the ID card 100, the ID card 100 and lens 116 will deform and produce a poor product. The level of mold release is a factor in formulating a material that would optimize this process. Exterior mold release agents can be used in conjunction with internal mold releases to improve the process. The type of exterior mold release will also have an effect.

For purposes of further illustration, FIGS. 14A-D are cross-sectional, perspective, side, and edge views, respectively, of the insulator plate of the embosser of FIG. 11, and FIGS. 15A-D are top, cross-sectional, edge, and perspective views, respectively, of the heater bar of the insulator plate of FIGS. 14A-D and FIG. 11. The insulator plate and heater bar can be formed of any suitable materials, including mild steel (CRS), glastherm, and high temperature insulating material.

FIG. 16 is a flow chart of a first method for manufacturing the ID document of FIG. 3 using the system of FIG. 11, in accordance with one embodiment of the invention. The detailed description of these method steps already has been done in connection with the description accompanying FIGS. 3, 10, 11, 12, and 13, and is not repeated here.

The above described embodiments were provided to illustrate one aspect of the invention, in which a multiple imaged ID document having a lenticular lens feature can be manufactured by laminating the ID document then embossing a lenticular lens into the laminate. It should be understood, however, that the invention is not limited solely to forming a lenticular lens after lamination in the above-described manner. Those skilled in the art will appreciate that lenticules can be formed after lamination in many different ways. For example, in at least some embodiments of the invention the lenticules 116 of the identification documents described herein can be created by physically removing some of the laminate to achieve the desired shape, such as by etching, engraving, milling, scratching, stamping, abrading, bending, filing, cutting, inscribing, and the like. The removal of the laminate can be done using any known tooling, through chemical processes (e.g., chemical etching) or by a laser. It also is contemplated that in at least some embodiments of the invention, a mold could be used to form the laminate into lenticules as the laminate is applied to the information bearing layer 106.

It is unclear at the time of filing whether roll laminates containing an extrusion formed lens or laminate with previously formed lenses and respective registration marks for later lamination processes to form ID documents are available. However, the invention proposes a method to make such a roll laminate, below.

In another aspect of the invention, the formation of lenticules 116 on the laminate 102 occurs prior to the laminating of the laminate to the information bearing layer 106. For example, embossing of the laminate 102 with lenticules can occur prior to lamination. In one embodiment, a multiple imaged ID document can be formed by using sheets of laminate having lenticular lenses already formed thereon. A separate process step can be used to form the lenticular lenses on the laminate. This embodiment of the invention can be achieved using a system similar to the system shown in FIG. 11. Instead of providing an embosser 524, however, a system of this aspect provides a roll of laminate material that includes lenticular lenses formed thereon. Advantageously, the laminate having lenticular lenses formed thereon also includes registration marks within the laminate, to assist in accurately registering the lenticular lens to the interlaced image as the laminate is laminated to the image.

Figure 18:
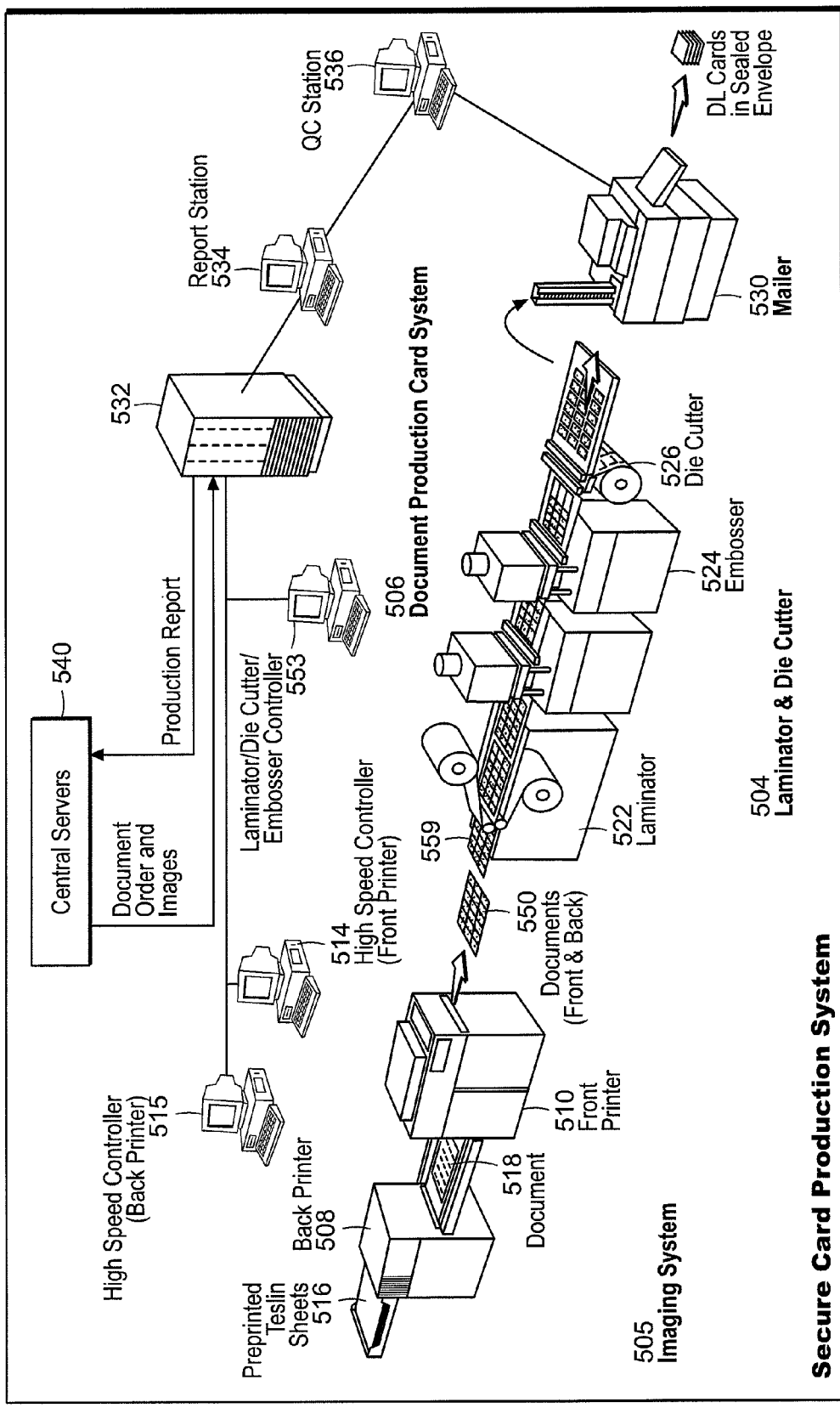
FIG. 18 is an illustrative diagram of a second central issue card production system that can be used to produce the ID document of FIG. 3, in accordance with one embodiment of the invention.
Figure 19:
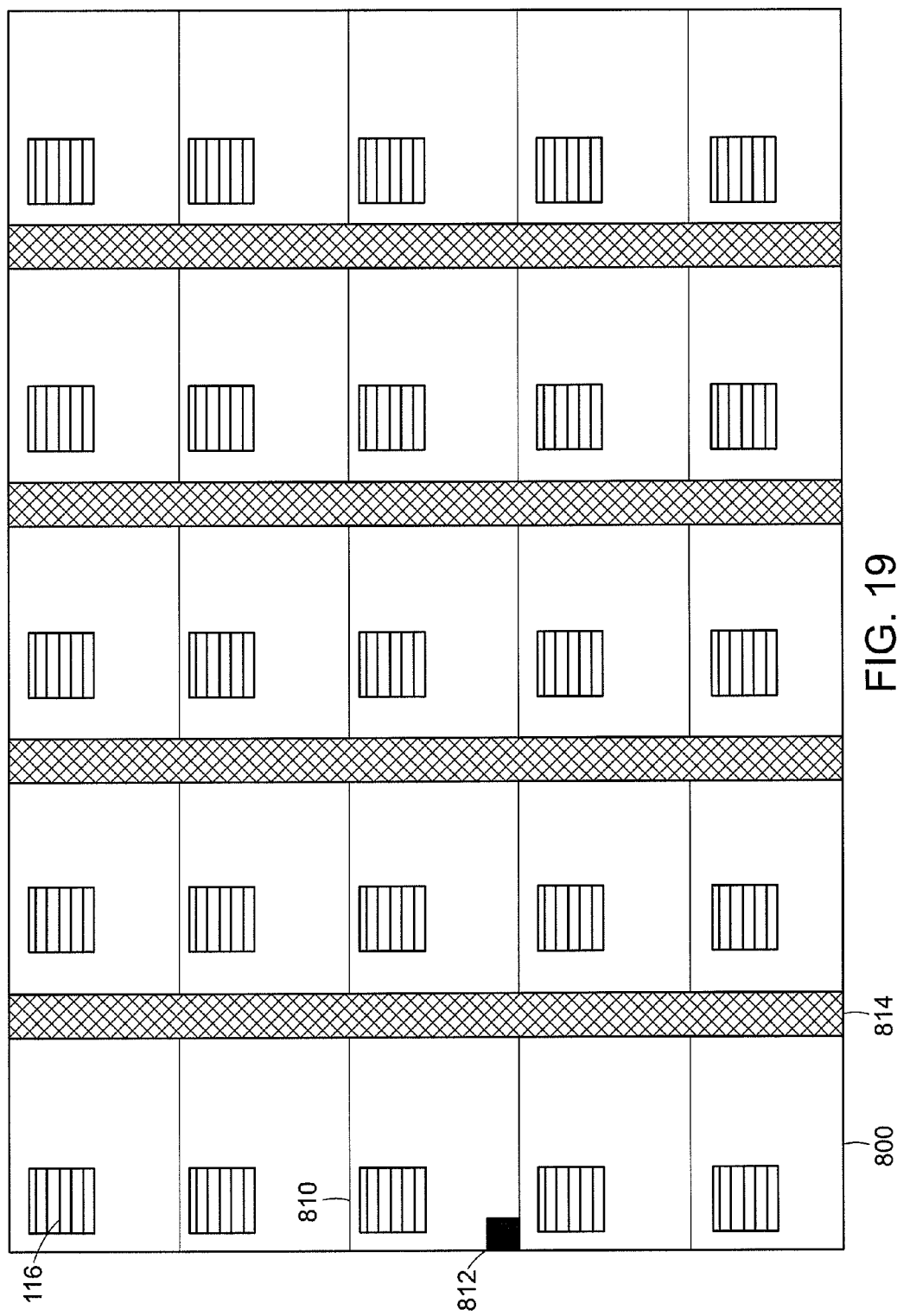
FIG. 19 is an illustration of a portion of a laminate roll showing a laminate with lenticular lenses embossed thereon.

For example, FIG. 17 is a flow chart of a method for manufacturing the ID document of FIG. 3 in a central issue environment where the creation of lenticules on the laminate 103 occurs prior to lamination, FIG. 18 is an illustrative diagram of a second central issue card production system 500' that can be used to produce the ID document of FIG. 3 in accordance with the method of FIG. 17, and FIG. 19 is an illustration of a portion of a laminate roll 800 showing laminate having lenticular lenses 116 formed thereon.

Referring to FIG. 17, laminate is provided (step 700). The laminate can be any laminate described previously that also is capable of being formed into lenticules. As will be readily understood by those in the art, the laminate can be provided in any usable form, such as pellet, powder, hot melt, and the like. The laminate is extruded (step 703) in a manner known to those skilled in the art, and then the laminate is processed so that predetermined areas of the laminate have lenticular lens features (such as the lenticules 116 of FIGS. 3 and 4) formed thereon. In one embodiment, the processing of the laminate comprises using one or more known processes to form or emboss the lenticular shapes into predetermined areas of the laminate, prior to the laminate being laminated to the card. Such processes can, for example include embossing rollers, vacuum drums, vacuum forming dies, in line corrugators and shapers, cutters, punches, etc., all of which are described, e.g., on pages 354-360 of Sidney Levy and James F. Carley, *Plastics Extrusion Technology Handbook* ($2^{nd}$ ed., New York, 1989). Further, one or more methods detailed in the following U.S. patents also may be useable, in at least some embodiments of the invention, for forming the lenticules in the laminate: U.S. Pat. Nos. 2,815,310, 3,496,263, 4,765,656, 5,560, 799. The contents of these patents are incorporated by reference in their entirety. It also will be appreciated by those skilled in the art that prior to lamination to the card, certain laminates can have lenticules formed thereon by etching, engraving, milling, scratching, stamping, abrading, bending, filing, cutting, inscribing, and the like.

Referring again to FIG. 17, after the lens(es) are formed in the laminate, registration information is applied to the laminate (710), to ensure that the laminate is appropriately aligned to the information bearing document(s) to which it is attached. FIG. 19 is an illustration of a portion of a sheet of laminate roll 800 prior to step 715. In FIG. 19, it can be seen that a plurality of lenticular lenses 116 are formed in a registered fashion on the sheet of laminate 800. The sheet of laminate 800 in this example has been formed with divider lines 800 thereon, to further assist the later registration and lamination to the information bearing layer 106. The dotted lines 810 are provided for illustrative purposes only (these lines are not necessarily on the laminate) to show where the divisions between ID documents lie. A registration mark 812 is provided on one side of the laminate 800 also will assist when the laminate 800 is later coupled to the information bearing layer 106.

In at least one embodiment, the sheet of laminate 800 is part of a larger sheet of laminate that is eventually rolled (step 715) so that it can be used as the special laminate 559 of FIG. 18. Referring to FIGS. 17 and 18, when the documents 550 are fed to the laminator 522, the laminate is aligned so that each respective lenticular lens 116 is appropriately aligned to a corresponding multiple image feature on the information bearing layer 106. (step 720). The identification documents can then be laminated (step 725) and die cut (step 730) as described previously.

It should be understood that the lenticular multiple image information of at least some embodiments of the invention can be provided in any color, not only black. This is accomplished at least in part because the interlaced image is printed directly on the card and is produced using the original images. If the original images are in color then the interlaced image can have the same color replicated therein.

Having described and illustrated the principles of the technology with reference to specific implementations, it will be recognized that the technology can be implemented in many other, different, forms.

Although certain words, languages, phrases, terminology, and product brands have been used herein to describe the various features of the embodiments of the invention, their use is not intended as limiting. Use of a given word, phrase, language, terminology, or product brand is intended to include all grammatical, literal, scientific, technical, and functional equivalents. The terminology used herein is for the purpose of description and not limitation.

The technology disclosed herein can be used in combination with other technologies. Examples include the technology detailed in the following applications, the disclosures of which are incorporated herein by reference: Ser. No. 09/747, 735 (filed Dec. 22, 2000), Ser. No. 09/969,200 (filed Oct. 2, 2001). Also, instead of ID documents, the inventive techniques can be employed with product tags, product packaging, business cards, bags, charts, maps, labels, etc., etc., particularly those items including engraving of an over-laminate structure. The term ID document is broadly defined herein to include these tags, labels, packaging, cards, etc. In addition, while some of the examples above are disclosed with specific core components, it is noted that-laminates can be sensitized for use with other core components.

To provide a comprehensive disclosure without unduly lengthening the specification, applicant hereby incorporates by reference each of the patents and patent applications referenced above.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

The invention claimed is:

1. A computerized method of preparing and printing an identification document, the method being performed by execution of computer readable program code by a controller of a computer system, the method comprising the steps of:

the computer system providing image information to a printer, the information relating to the printing to be applied to the identification document, the image information being arranged to include at least a first and a second interleaved different images;

wherein the at least first and second interleaved images are formed by:

(a) dividing each of the at least first and second images into a selected number of rows of image portions;

(b) creating an interface file for receiving the interleaved images;

(c) selecting a first image row to be interleaved from the first of the at least first and second images;

(d) writing the first image row from the first image to the interfaced file;

(e) writing a second image row from the second image to the interfaced file adjacent to the image row from the first image;

(f) repeating steps (d) and (e) until all the selected number of rows from the at least first and the second image portions have been interleaved in the interfaced file;

printing the at least first and second interleaved different images onto an image layer of an identification document substrate;

applying a laminate over the image layer;

using pressure to emboss a lens profile into the laminate; and, wherein, the document formed of the at least two interleaved different images in the image layer and the lens profile enables display of each one of the at least the first and second different interleaved images when the document is viewed at different predetermined angles, the lens profile including lens elements that direct light to the at least different first and second images at different corresponding viewing angles causing the at least first and second different images to appear and disappear with changing viewing angles.

2. The method of claim 1 wherein the image information represents variable information associated with a bearer of the document.

3. The method of claim 1 wherein ink or dye of different colors is used to form colored image information.

4. The method of claim 1 wherein at least one of the two different images comprises an image of the bearer.

5. The method of claim 1 wherein the lens elements are formed as lenticules.

6. The method of claim 5 wherein the lenticules are aligned with the rows of interleaved images on the image layer.

7. The method of claim 1 wherein laser engraving forms the image information.

* * * * *